US007119960B1

(12) United States Patent
Erdogan et al.

(10) Patent No.: US 7,119,960 B1
(45) Date of Patent: Oct. 10, 2006

(54) METHOD OF MAKING HIGH PERFORMANCE OPTICAL EDGE AND LASER-LINE FILTERS AND RESULTING PRODUCTS

(75) Inventors: Turan Erdogan, Spencerport, NY (US); Joseph T. Foss, Rochester, NY (US); Ligang Wang, Rochester, NY (US)

(73) Assignee: Semrock, Inc., Rochester, NY (US)

( * ) Notice: Subject to any disclaimer, the term of this patent is extended or adjusted under 35 U.S.C. 154(b) by 0 days.

(21) Appl. No.: 11/151,728

(22) Filed: Jun. 13, 2005

Related U.S. Application Data

(63) Continuation-in-part of application No. 10/840,134, filed on May 6, 2004, now Pat. No. 7,068,430.

(60) Provisional application No. 60/578,978, filed on Jun. 14, 2004, provisional application No. 60/468,245, filed on May 6, 2003.

(51) Int. Cl.
*G02B 5/28* (2006.01)

(52) U.S. Cl. ............ 359/589; 359/590; 359/587; 359/588; 359/580

(58) Field of Classification Search ............ 359/589, 359/590; 204/192.13
See application file for complete search history.

(56) References Cited

U.S. PATENT DOCUMENTS

| | | | |
|---|---|---|---|
| 4,142,958 A | | 3/1979 | Wei et al. |
| 4,793,908 A | | 12/1988 | Scott et al. |
| 5,272,518 A | * | 12/1993 | Vincent ............ 356/405 |
| 6,649,208 B1 | | 11/2003 | Rodgers |
| 6,809,859 B1 | | 10/2004 | Erdogan et al. |
| 2005/0110999 A1 | | 5/2005 | Erdogan et al. |
| 2005/0167264 A1 | * | 8/2005 | Sternbergh et al. ..... 204/192.13 |

OTHER PUBLICATIONS

Becker, J., "Ion-Beam Sputtering," Handbook of Optical Properties, vol. 1, Thin Films for Optical Coatings, Ed. By R.E. Hummel and K.H. Guenther, pp. 189-211, (CRC Press, Boca Raton, 1995).
Macleod, H. Angus, "Thin-Film Optical Filters," 3$^{rd}$ Ed., Institute of Physics (2001).
Macleod, H.A., "Turning value monitoring of narrow-band all-dielectric thin-film optical filters," Optica Acta, vol. 19, pp. 1-28 (1972).
Press, W.H., et al., The Levenberg-Marquardt method implemented under the name "mrqmin( )", *Numerical Recipes in C: The Art of Scientific Computing*, 2$^{nd}$ ed., Chapter 15, pp. 683-688 (1995).
Martin, P.J., "Ion-beam-assisted deposition of thin films," Applied Optics, vol. 22, No. 1, pp. 178-184 (1983).
"Interference Filters," Melles Griot, pp. 13.25-13.29.

* cited by examiner

*Primary Examiner*—Fayez G. Assaf
(74) *Attorney, Agent, or Firm*—Lowenstein Sandler PC

(57) ABSTRACT

High performance optical edge and laser-line filters and methods of making the same are disclosed. The optical edge filters have an edge steepness greater than about 0.8% as measured by dividing (a) the edge width from the 50% transmission wavelength to the optical density 6 ("OD6") wavelength by (b) the 50% transmission wavelength. The optical edge filters also have an average transmission above about 95%. The laser-line filters have an extremely high transmission in the passband (greater than 90%), an extremely narrow transmission bandwidth, and achieve blocking with an optical density (OD) greater than 5 at wavelengths that differ from the laser wavelength by less than 1% of the laser wavelength. The methods for making such filters accurately determine when deposition of each layer of the filter should terminate.

47 Claims, 13 Drawing Sheets

Cross section of a typical two-cavity pass interference filter

METHOD OF MAKING HIGH PERFORMANCE OPTICAL EDGE AND LASER-LINE FILTERS AND RESULTING PRODUCTS

CROSS REFERENCE TO RELATED APPLICATIONS

This application claims the benefit of U.S. Provisional Application No. 60/578,978, filed Jun. 14, 2004, and is a continuation in part of prior U.S. patent application Ser. No. 10/840,134, filed May 6, 2004, now U.S. Pat. No. 7,068,430 B1, which claims the benefit of U.S. Provisional Application No. 60/468,245, filed May 6, 2003. The entire disclosures of U.S. Provisional Application No. 60/578,978, U.S. patent application Ser. No. 10/840,134, and U.S. Provisional Application No. 60/468,245 are hereby incorporated herein by reference.

FIELD OF INVENTION

This invention relates to methods of making optical edge filters and laser-line filters and also relates to the resulting improved filters.

BACKGROUND OF THE INVENTION

A. Optical Edge Filters, Laser-Line Filters, and Their Use

Optical edge filters and laser-line filters are important components in systems for optical measurement and analysis including Raman spectroscopy and fluorescence spectroscopy. Optical edge filters and/or laser-line filters are used in such systems to block unwanted light that would otherwise constitute or generate spurious optical signals and swamp the signals to be detected and analyzed.

Optical edge filters block unwanted light having wavelengths above or, alternatively, below a chosen "transition" wavelength $\lambda_T$ while transmitting light on the unblocked side of $\lambda_T$. Edge filters which transmit optical wavelengths longer than $\lambda_T$ are called long-wave-pass filters (LWP filters), and edge filters which transmit wavelengths shorter than $\lambda_T$ are short-wave-pass or SWP filters.

Referring to the drawings, FIGS. 1A and 1B schematically illustrate the spectral transmission of idealized long-wave-pass and short-wave-pass filters respectively. As can be seen from FIG. 1A, a LWP filter blocks light with wavelengths below $\lambda_T$ and transmits light with wavelengths above $\lambda_T$. As shown in FIG. 1B, a SWP filter transmits light with wavelengths below $\lambda_T$ and blocks light with wavelengths above $\lambda_T$. $\lambda_T$ is the wavelength at which the filter "transitions" from blocking to transmission, or vice versa.

While an ideal edge filter has a precise transition wavelength $\lambda_T$ represented by a vertical line at $\lambda_T$, real edge filters change from blocking to transmission over a small range of wavelengths and are more accurately represented by a non-vertical but steeply sloped line near $\lambda_T$. Similarly, while an ideal edge filter transmits all light in the transmission region (transmission T=1), real filters invariably block a small portion of the light to be transmitted (T<1). The steepness of the line and the proportion of the light transmitted are important parameters in many applications.

Turning now to FIGS. 1C and 1D, the spectral transmission of an ideal and a realistic laser-line filter ("LLF") are illustrated respectively. Because lasers emit a very small, but non-zero, bandwidth of light, an ideal LLF passes light at wavelengths within this bandwidth ($\lambda_L$ to ($\lambda_L$+BW)) with no ripple and perfectly steep (vertical) passband edges, as shown in FIG. 1C. The ideal LLF blocks light at wavelengths longer than the passband ($\lambda>(\lambda_L$+BW)) and blocks light at wavelengths shorter than the passband ($\lambda<\lambda_L$). The realistic LLF does not have complete transmission within the passband ($\lambda_L$ to ($\lambda_L$+BW)) and has non-vertical passband edges, thereby changing from blocking to transmission over a small range of wavelengths, as shown in FIG. 1D. Accordingly, the steepness of the edges, the transmission, bandwidth, and the proportion of the light transmitted are important parameters of LLFs in many applications.

Edge filters and LLFs are particularly useful in optical measurement and analysis systems that use laser light to excite a sample at one wavelength $\lambda_L$ (or a small band of wavelengths) and measure or view an optical response of the excited sample at other wavelengths. The excitation light $\lambda_L$ is delivered to the sample by an excitation light path, and the optical response of the sample is delivered to the eye or measuring instrument by a collection path. Edge filters and LLFs can be used to block spurious light from the excitation path. Edge filters can be used to block excitation light from entry into the collection path. The steeper the filter edge(s), the more effectively spurious signals are blocked. In the case of edge filters, the lower the transmission loss, the more light from the sample reaches the measuring instrument. In the case of LLFs, the lower the transmission loss, the more excitation light from the laser reaches the sample.

Raman spectroscopy is one such optical analysis system. It is based on the fact that when molecular material is irradiated with high intensity light of a given wavelength (or series of wavelengths) $\lambda_L$, a small portion of the incident light scattered by the material will be shifted in wavelength above and below $\lambda_L$. This Raman shifting is attributed to the interaction of the light with resonant molecular structures within the material, and the spectral distribution of the Raman-shifted light provides a spectral "fingerprint" characteristic of the composition of the material. As a practical example, a Raman probe can identify the contents of a bottle without opening the bottle.

FIG. 2 is a simplified schematic diagram of a Raman probe 20. In essence, the probe 20 comprises an optical excitation path 22, and a collection path 23. These paths advantageously comprise optical fiber. FIG. 2 first will be described with the use of edge filters and then will be described with the use of a LLF.

In the case where edge filters are used, the Raman probe 20 may be configured to excite and collect the long wavelength portion of Raman-shifted light from a sample 21. In this case, edge filters 22A and 23A are disposed in the respective paths. In operation, excitation light $\lambda_L$ from a laser 24 passes through the fiber path 22 and edge filter 22A to illuminate a portion of the sample 21 with high intensity light. Light scattered from the sample 21 passes through edge filter 23A and then through fiber collection path 23 to a spectral analyzer 25 where the "fingerprint" of the sample is determined.

Since a fiber path 22 through which the excitation signal passes is composed of molecular material, a small portion of the excitation light will be shifted in wavelength by the Raman effect in the fiber. This shifted light must be eliminated to prevent false readings. The removal can be accomplished by disposing a SWP edge filter 22A between the fiber 22 and sample 21. SWP edge filter 22A, having a transition wavelength just above the laser wavelength $\lambda_L$, blocks both long wavelength Raman scattering from the fiber and long wavelength noise from the laser.

However, in some cases, a filter 22A is not needed. For instance, if the excitation signal is direct laser radiation that does not pass through molecular material at any appreciable length, and contains no appreciable light at wavelengths other than the desired laser line itself, then the filter 22A is not necessary. An example would be direct laser radiation illuminating a sample 21 through a vacuum.

The light scattered from the sample 21 is a mixture of unshifted scattered excitation light $\lambda_L$ (Rayleigh scattering) and Raman-shifted light at wavelengths longer and shorter than $\lambda_L$. The scattered excitation light would not only swamp the analyzer, it would also excite spurious Raman scattering in a collection fiber. Thus the unshifted excitation light should be removed from the collection path. This can be accomplished by disposing a long pass edge filter 23A between the sample 21 and the collection fiber 23, the long pass filter having a transition wavelength $\lambda_T$ just below the excitation wavelength $\lambda$. This arrangement ensures that the light reaching the analyzer is predominantly the long wavelength Raman-shifted light from the sample. Analogous arrangements using edge filters can be used to analyze short wavelength Raman-shifted light.

FIG. 2 also may use a LLF to excite Raman-shifted light from the sample 21. In this case, a LLF 22A and a blocking edge or notch filter 23A are disposed in the respective paths. In operation, excitation light from a laser 24 passes through the fiber path 22 and the LLF 22A to illuminate a portion of the sample 21 with high intensity light of a wavelength (or series of wavelengths) $\lambda_L$. Light scattered from the sample 21 passes through the blocking edge or notch filter 23A to block $\lambda_L$ and then through fiber collection path 23 to a spectral analyzer 25 where the "fingerprint" of the sample is determined.

As with the edge filter configuration, since the fiber 22 through which the excitation signal passes is composed of molecular material, a small portion of the excitation light will be shifted in wavelength by the Raman effect in the fiber. This shifted light is eliminated by LLF 22A. LLF 22A passes the laser wavelength and blocks both long and short wavelength Raman scattering from the fiber.

The unshifted scattered excitation light is removed from the collection path. The notch or edge filter removes the laser light of wavelength $\lambda_L$. This arrangement ensures that the light reaching the analyzer is predominantly Raman-shifted light from the sample.

Edge filters and LLFs are also useful in fluorescence spectroscopy. Here, laser excitation light is used to excite longer wavelength emission from fluorescent markers. The markers can be fluorescent atoms chemically bonded to a biological molecule to track the molecule in a body or cell. LLFs may be used, as in Raman spectroscopy, to reject spurious light from the excitation path. Notch filters may be used to reject excitation light from the collection path. Edge filters may be used to reject spurious light from the excitation path and to reject excitation light from the collection path.

In the case of edge filters, it should now be clear that the steeper the filter slope at the transition wavelength $\lambda_T$ the greater the amount of spurious light that can be filtered out. In addition, the steeper the slope, the greater the amount of shifted light from the sample that will reach the analyzer. Similarly, higher levels of transmission of the shifted light through the filters provide more light for analysis. Higher edge filter blocking provides better rejection of the laser excitation light from the spectrum analyzer, thus decreasing the noise and improving both specificity and sensitivity of the measurement. Higher edge-filter transmission enables the maximum signal to reach the analyzer, further improving the signal-to-noise ratio and hence the measurement or image fidelity. A steeper filter edge also permits shifts to be resolved much closer to the excitation wavelength, thus increasing the amount of information from the measurement.

In the case of LLFs, the steeper the edges of the LLF at the laser wavelength $\lambda_L$, the greater the amount of spurious light that can be filtered out. Similarly, higher levels of transmission of the laser light through the LLF, the more light for excitation.

B. Edge Filter and LLF Structure and Conventional Fabrication

FIG. 3A is a simplified schematic illustration of an optical edge filter 30. The optical edge filter 30 comprises a transparent substrate 31 having a flat major surface 32 supporting many thin coatings 33A, 33B. The thickness of the coatings is exaggerated and the number is reduced for purposes of illustration. Coatings 33A and 33B are typically alternating and of different respective materials chosen to present markedly different indices of refraction (index contrast). The coating indices and thicknesses are chosen and dimensioned to filter impinging light by interference effects in a desired manner. Specifically, if a light beam 34 impinges on the filter, a first wavelength portion 34T of a beam is transmitted and a second wavelength portion 34R is reflected and thus rejected by the filter. What is transmitted and what is reflected depends on the precise thicknesses and indices of the thin coatings.

Two basic types of thin-film edge filters and thin-film laser-line filters exist: those based on "soft coatings" and those based on "hard coatings," both of which are typically manufactured by an evaporation technique (either thermal evaporation or electron-beam evaporation). Hard coating filters, however, may also be manufactured by non-evaporative techniques such as ion-beam sputtering.

Soft coatings imply literally what the name suggests—they are physically soft and can be readily scratched or damaged. They are fairly porous, which also means they tend to be hygroscopic (absorb water vapor) leading to dynamic changes in the film index and hence the resulting filter spectrum in correlation to local humidity. There are two main reasons soft coatings are used. First, an advantageous larger index contrast can be realized with soft coatings. (The index contrast is the relative difference between the index of refraction of the low-index material and that of the high-index material.) For example, many high-performance soft-coated filters are made using sodium aluminum fluoride ("cryolite"), with a chemical composition of $Na_3AlF_6$ and an index of about 1.35 for visible wavelengths, and zinc sulfide, with a chemical composition of ZnS and an index of about 2.35. The second reason for using these materials is that the evaporation process can be controlled well for these materials, largely because they have relatively low melting temperatures. Hence it is possible to maintain fairly accurate control over the layer thicknesses even for filter structures with many 10's of layers and perhaps even up to 100 layers. As described above, edge filter performance is measured by edge steepness, depth of blocking, and high transmission with low ripple. A larger index contrast and a larger number of layers both yield more steepness and more blocking. High transmission with low ripple is improved with more layers and higher layer thickness accuracy. For these reasons the highest performance conventional thin-film edge filters have been made with soft-coating technology.

Hard coatings are made with tougher materials (generally oxides), and result from "energetic" deposition processes, in which energy is explicitly supplied to the film itself during the deposition process. This is accomplished with a beam of ions impinging directly on the coating surface. The ion bombardment acts to "hammer" the atoms into place in a more dense, less porous film structure. Such processes are usually called ion-assisted deposition (IAD) processes. High-performance edge filters have been made with ion-assisted electron-beam evaporation. Typically the index contrast available with hard-coating (oxide) thin-film materials is not as high as that of the soft-coating materials, and consequently more layers must be deposited to achieve a comparable level of performance. This problem, coupled with the more difficult to control deposition rates and overall processes of high-melting-temperature oxides, leads to much more stringent requirements on the layer-thickness control techniques to achieve a reasonable level of layer thickness accuracy for good edge steepness and high, low-ripple transmission.

For the best filters, some kind of "optical monitoring" (direct measurement of filter transmission or reflection during deposition) is necessary to determine when to terminate the deposition of each layer. Optical monitoring can be performed on the actual filters of interest or on "witness pieces" often positioned in the center of the deposition chamber. There are three basic types of optical monitoring algorithms. The first is often called "drop-chip" monitoring, and is based on measuring the transmission (or reflection) vs. time through a new witness piece for each new layer. Since the theoretical transmission vs. time can be calculated accurately for each layer deposited on a blank piece of glass, then a good comparison between the measured and theory curves can be made independent of the history of the deposition (thickness errors in previous layers). This technique is accurate and useful for layers of arbitrary thickness, but it is cumbersome, especially for filters comprised of at least many 10's of layers.

The second type of monitoring is called "turning-point" monitoring, and is used for depositing layers that are precisely a quarter of a wavelength in thickness (or multiples thereof). The technique is based on the fact that the transmission vs. time reaches a turning point (or extremum) at each multiple of a quarter wave of thickness, so an algorithm is developed to cut layers precisely at the turning points. The elegant feature of this method is that there is inherent compensation for layer thickness errors from previous layers, so long as one adheres to the rule of cutting exactly at turning points. It thus works extremely well even for very thick coatings with even hundreds layers (it is the basis for manufacturing very high-performance filters for DWDM telecom applications, which can have as many as 200–400 quarter-wave layers).

The third type of monitoring is called "level monitoring," and is applicable for non-quarter-wave thick layers. Monitoring can be done through the actual filters or through witness piece(s). The concept is to cut layers at predetermined transmission levels, based on a calculated prediction of transmission vs. time for the entire structure. However, because small layer errors lead to large variations in the absolute transmission values, one must instead rely on cutting at the correct transmission level relative to the local maximum and minimum values. Hence the method works well only for non-quarter-wave thick layers that are more than a half-wave thick, so that there is both a maximum and a minimum transmission value in the transmission vs. time curve for that layer. Even in this case, this method does not contain inherent compensation for errors in the thickness of previously deposited layers, and thus is not as forgiving as the turning-point method. However, to obtain an edge filter with high transmission and low ripple requires primarily non-quarter-wave thick layers, and hence turning-point monitoring is not applicable for edge filters.

Turning now to FIG. 3B, a typical conventional laser-line filter 300 of the thin film type is illustrated. The filter 300 comprises a bandpass section 301 to define the passband and provide blocking in the immediate spectral vicinity of the passband. It further comprises a blocker section 302 to provide additional blocking at wavelengths further away from the passband.

The bandpass section 301 comprises a sequence of dielectric layers forming a sequence of Fabry-Perot cavities combined with appropriate "coupling layer" spacers between them. Each Fabry-Perot cavity comprises alternating layers of high index material 303 and low index material 304, where most layers have a thickness of one quarter wavelength at the passband center wavelength. In isolation, each quarter wave stack would provide high reflection blocking of a broad stopband about the center wavelength. However, when a pair of such quarter wave stacks are coupled to one another with an intervening half-wavelength cavity layer 305 of high or low index material, a Fabry-Perot cavity is formed, and a narrow, high-transmission passband is opened in the center of the stopband region. When multiple Fabry-Perot cavities are combined with appropriate "coupling layers" between them, the narrow passband region achieves a more rectangular passband shape, with steeper edges and a proportionally wider, flatter region of high transmission. While most laser-line filters are based on at least two Fabry-Perot cavities, it is not uncommon for laser-line filters to be comprised of three or more cavities. The stopband associated with a multi-cavity Fabry-Perot structure blocks light over only a limited region of wavelengths. For instance, for a structure based on $SiO_2$ as the low-index material (n=1.5) and $Nb_2O_5$ as the high-index material (n=2.3), the stopband ranges from about $\lambda_c/1.14$ to $\lambda_c/0.86$, where $\lambda_C$ is the center wavelength of the passband.

To provide additional blocking at wavelengths further away from the passband, prior-art thin-film filters rely on the addition of the blocker section 302 comprising a combination metal-dielectric blocking coating 306, or absorbing colored glass 307, or both. The metal-dielectric coating can be designed to have a passband centered on the narrow passband associated with the multi-cavity Fabry-Perot coating, but the metal-dielectric coating passband is generally very broad. Absorbing colored glass is used primarily to block short wavelengths. The major disadvantage of such additional coatings and colored glass is that they severely limit the transmission of light in the passband due to optical absorption losses in the metal layer(s) and/or the absorbing glass. Therefore, the passband transmission for such filters typically does not exceed about 70% and often is as low as 10% (for most filters the transmission is in the range 20–50%).

Holographic laser-line filters are comprised of a volume diffraction grating, a mount, and some kind of spatial filtering apparatus. It functions as follows: first, a collimated, linearly polarized laser beam is directed perpendicularly into the mount that holds the volume diffraction grating (which itself is comprised of the holographic material, often dichromated gelatin, sandwiched between pieces of glass to protect it from environmental and physical contact). The internal transmission grating diffracts the laser-line through 90 degrees so that the output beam is nominally perpendicular to the input laser beam and the exit face of the mount. The grating is spectrally selective so that only the light which is very close to the design wavelength of the filter is diffracted. The undiffracted light passes through the back face of the mount. Unwanted light with wavelengths near the laser-line is diffracted by the transmission grating but at different angles than the laser-line. This unwanted diffracted light is then removed by a spatial filter (slit or aperture) located beyond the exit face of the cube. The overall apparatus provides effective filtering, but is very inconvenient to use due to the redirection of the laser beam, the bulky nature of the setup, and the need to carefully align the spatial filter with the mounted diffraction grating. Furthermore, the requirement that the desired laser beam be linearly polarized in a particular orientation is severely limiting to the applicability of this filter.

Accordingly there is a need for an improved method of making optical edge filters and LLFs and for improved edge filters and LLFs having increased edge steepness and increased transmission.

SUMMARY OF THE INVENTION

These problems are addressed and a technical solution achieved in the art by high performance optical edge filters, high performance laser-line filters, and methods of making the same according to an embodiment of the present invention. In particular, the optical edge filters have an edge steepness less than about 0.8% as measured by dividing (a) the edge width from the 50% transmission wavelength to the optical density 6 ("OD6") wavelength by (b) the 50% transmission wavelength. The optical edge filters also have an average transmission above about 95%. The laser-line filters have an extremely high transmission in the passband (greater than 90%), an extremely narrow transmission bandwidth, and achieve blocking with an optical density (OD) greater than 5 at wavelengths that differ from the laser wavelength by less than 1% of the laser wavelength. The methods for making such filters accurately determine when deposition of each layer of the filter should terminate. The methods include calculating theoretical transmission data for a layer of the filter and calculating an expected deposition duration for the layer. The methods also include measuring transmission through the layer during deposition for a period less than the expected deposition duration. When the measuring period elapses, a new deposition duration is calculated based upon the theoretical transmission data and the measured transmission data, thereby providing an accurate deposition duration for the layer.

BRIEF DESCRIPTION OF THE DRAWINGS

The advantages, nature and various additional features of the invention will appear more fully upon consideration of the illustrative embodiments now to be described in detail in connection with the accompanying drawings. In the drawings.

DETAILED DESCRIPTION OF THE INVENTION

The invention has four aspects: A) apparatus programmed to make improved optical edge and laser-line filters; B) the method of making the improved filters; C) the improved filters made by the method and D) applications of the improved filters. These aspects will be described in the order presented.

A. Apparatus For Making Optical Edge and Laser-Line Filters in Accordance with an Embodiment of the Invention Optical edge filters and laser-line filters in accordance with an embodiment of the invention are made using a computer-controlled deposition system. Advantageously the deposition is an ion beam sputtering deposition system using a beam assist source for depositing hard coatings and having an integral optical monitoring system to monitor deposition. A data processor, responsive to signals from the monitoring system, processes these signals and directs the growth of improved optical edge filters in accordance with algorithms described below.

Figure 4:
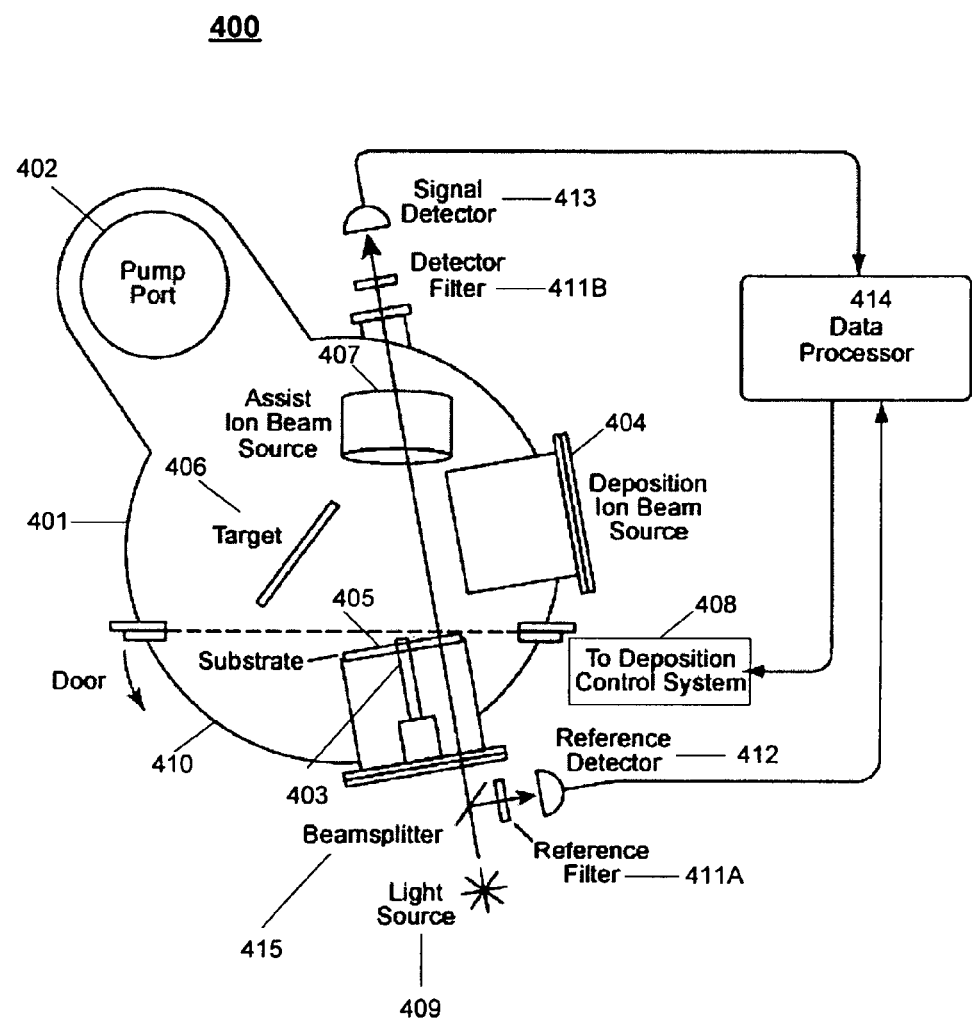
FIG. 4 is a schematic diagram of apparatus useful in making an optical edge filters and laser-line filters in accordance with an embodiment of the invention.

FIG. 4 is a schematic view of an advantageous computer-controlled deposition apparatus 400 for practicing ion-assisted, ion-beam sputtering disposition and optical monitoring under data processor control. The apparatus 400 comprises a vacuum chamber 401 having an interior accessible by a sealable port 410 such as an o-ring sealed door. The chamber 401 includes a pump port 402 for coupling to one or more evacuation pumps (not shown) such as mechanical and low pressure cryogenic pumps.

Within the chamber 401 is a substrate mount 403 which is advantageously a rotatable spindle mount. Also within the chamber are a plurality of material targets, a deposition ion beam source 404, and a mounted substrate 405. One of the targets 406 is positioned in relation to the ion beam source and the substrate so that an ion beam from the source will sputter material from the target onto the substrate in a substantially uniform layer. Typically there are separate targets for each material to be deposited on the substrate, and the targets are movable to and from the sputtering position. There are usually two material targets: one a high optical index material and the other a low index material. The targets are movable so that deposition can be switched automatically from one material to the other.

An assist ion beam source 407 is disposed in the chamber 401 in position to bombard the substrate 405 with an ion beam. During the deposition of any one material, the substrate is simultaneously bombarded by sputtered material and by ions from the assist ion beam source 407. The assist ion bombardment serves to energize the adhesion of particles onto the surface of the substrate and thereby produce a substantially more dense ("hard") film than would otherwise be formed by sputter deposition. See P. J. Martin et al., "Ion-beam-assisted deposition of thin films," in Applied Optics, vol. 22, No. 1, pgs. 178–184 (1983).

Both the sputter deposition and the assist bombardment can be activated by a deposition control system 408. The control system 408 can start or stop deposition precisely by turning on and off the deposition ion beam source 404 or by removing or engaging a mechanical shutter (not shown) that covers the substrate. Further details concerning ion beam sputtering deposition systems can be found in U.S. Pat. No. 4,142,958 issued to David Wei et al. on Mar. 6, 1979 and U.S. Pat. No. 4,793,908 issued to Gene Scott et al. on Dec. 27, 1988, both of which are incorporated herein by reference. See also Juergen Becker, "Ion Beam Sputtering," Handbook of Optical Properties, Vol. 1, Thin Films for Optical Coatings, Ed. by R. E. Hummel and K. H. Guenther (CRC Press, Boca Raton, 1995).

The optical monitoring system advantageously comprises a light source 409, filters 411A and 411B, detectors 412 and 413 and a data processor 414. The light source 409 can be any sufficiently bright, broadband light source, such as a quartz halogen bulb or a Xenon discharge lamp. The detectors can include a reference detector 412 and a signal detector 413. The detectors can be semiconductor (Si) photodiodes, photomultiplier tubes or any other sensitive, low-noise detectors capable of detecting light at the monitoring wavelength.

In the advantageous arrangement shown here, a beamsplitter 415 picks off a portion 416 of the monitoring light beam 417 from source 409 and detects it with reference detector 412. The signal detector 413 detects the portion 418 of the beam 417 that passes through the coated substrate (or a "witness" substrate) being monitored. Advantageously, the filters 411A and 411B are positioned to ensure that a sufficiently narrow band of wavelengths is monitored.

The filters 411A, 411B can be narrow band interference filters, adjustable diffraction-grating monochromators or combinations thereof. Advantageously an interference filter is used for reference filter 411A and a monochromator is used for detector filter 411B. Further details concerning optical monitoring of thin films as they are being deposited can be found in U.S. Pat. No. 6,649,208 issued to Wayne Rodgers on Nov. 18, 2003, which is incorporated herein by reference. See also H. Angus Macleod, *Thin Film Optical Filters* (3$^{rd}$ Ed., Institute of Physics, Bristol, 2001) and H. A. Macleod, "Turning Value Monitoring of Narrow-Band All-Dielectric Thin-Film Optical Filters," *Optica Acta*, vol. 19, pp. 1–28(1972).

The data processor 414 collects data from the signal and reference detectors 413, 412, implements the mathematics associated with optical monitoring algorithms and instructs the deposition control system 408 when to stop depositing any given thin film layer based on the result of the mathematical calculations prescribed in the algorithm.

B. Methods of Making the Improved Edge Filters and Laser-Line Filters

The manner in which the data processor 414 controls the apparatus 400 via the deposition control system 408 to generate the optical edge filters and/or laser-line filters according to an embodiment of the present invention will now be described. In particular, the data processor 414 is programmed to instruct the apparatus 400 when to stop depositing each layer of the filter being manufactured. In regard to edge filters, the data processor 414 follows two separate processes in determining when deposition of a layer should terminate depending upon whether a long-wave-pass or a short-wave-pass filter is being manufactured. These two processes will be described in turn. A description of the processes performed for manufacturing a laser-line filter will follow.

Figure 5:
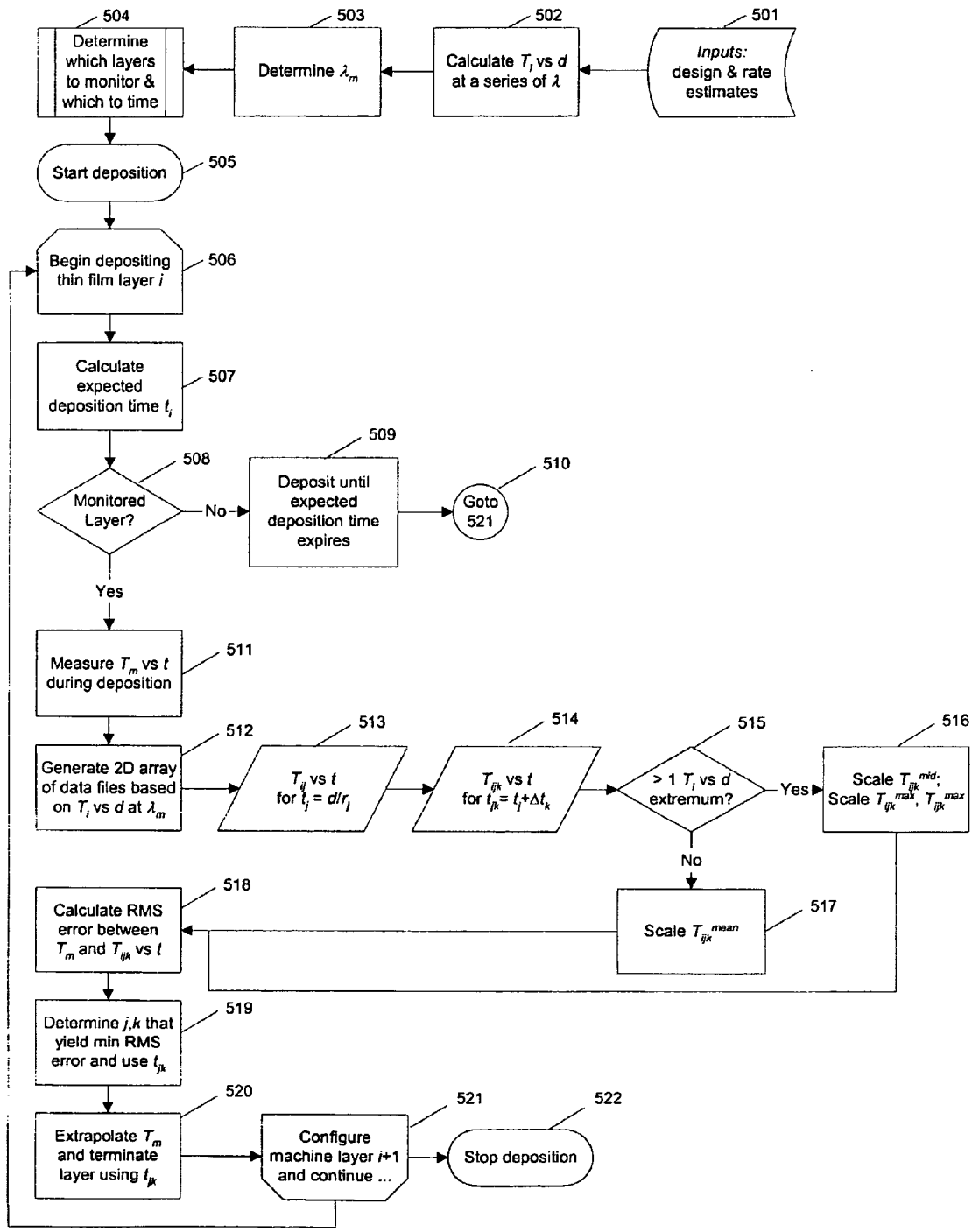
FIG. 5 is a process flow illustrating the process of manufacturing a long-wave-pass filter in accordance with an embodiment of the invention.

FIG. 5 illustrates the process flow executed by the data processor 414 when manufacturing a long-wave-pass ("LWP") filter according to an embodiment of the present invention. However, prior to initiating the process of FIG. 5, a design for the LWP filter is prepared. In the exemplary embodiment, the LWP filter has N layers and comprises two materials: a low-refractive-index material and a high-refractive-index material. The exemplary initial design for a steep LWP edge filter includes a quarter-wave ("QW") stack of (0.5H L 0.5H)^N, where L and H represent layers of high and low index materials with a quarter-wave of optical thickness at the reference wavelength. The reference wavelength is chosen so that the longer-wavelength edge of the QW stopband is close to the desired transition wavelength of the LWP filter design.

Once the initial design is setup, a desired target spectrum is constructed, which typically includes the wavelength ranges of both the blocking and passband regions, as well as the required blocking level and minimum transmission and allowable ripple within the passband. The edge steepness is thus indirectly defined as the wavelength separation between the blocking region and the passband.

The layer thicknesses of the initial design are then optimized against the target spectrum by an optimization routine known in the art. Exemplary optimization routines include the variable-metric or simplex methods implemented in standard commercial thin-film design software packages, such as TFCalc by Software Spectra, Inc., and The Essential Macleod by Thin Film Center Inc. Usually, with the proper choice of the initial design, the optimization quickly converges and the optimized structure is not very different from the initial structure. Special treatments may be necessary for the first layer (toward substrate) and the last layer. For instance, the optical thickness of the first layer may need to be manually increased—a typical minimum thickness in this case is two QWs. As for the last layer, it sometimes becomes too thin and thus may be eliminated. The structure should be re-optimized whenever there is any modification to the layer thickness.

With the LWP filter design at hand, the data processor 414 receives design data and deposition rate data as input at 501. The design data describes the designed thin-film structure of the LWP filter with a physical thickness $d_i$ and an index $n_i$ for each i$^{th}$ layer. $n_i$ is either $n_L$ or $n_H$, where $n_L$ is the refractive index of the low-index material and $n_H$ is the refractive index of the high-index material. $n_L$ and $n_H$ are each known as a function of wavelength $\lambda$. The deposition rate data describes the known starting deposition rate of the deposition apparatus 400 shown in FIG. 4 for each of the two materials. In the exemplary embodiment, the deposition rate data is within about +/−5% of the actual deposition rate and is in units of Å/sec. The starting rate estimates for each of the two materials are referred to as $r_L$ and $r_H$, and hence each layer will have a starting rate estimate $r_i$ depending on whether it is made of low-index or high-index material.

At 502, the transmission $T_i$ as a function of physical thickness d for each $i^{th}$ layer is calculated at a series of wavelengths in the transmissive band of the finished filter. Consequently, the calculations at 502 result in a series of curves $T_i$ vs. d at each of the series of wavelengths in the transmissive band of the finished filter. Such calculations are performed using standard mathematical methods for calculating the optical properties of thin-film filters. See, for example, H. A. Macleod, *Thin-film Optical Filters*, $3^{rd}$ edition (Institute of Physics, Bristol, 2001).

Advantageously, instead of calculating each $T_i$ vs. d curve at one corresponding wavelength in the series of wavelengths, each $T_i$ vs. d curve is calculated by averaging a plurality of $T_i$ vs. d curves calculated at a range of wavelengths surrounding the corresponding wavelength. For instance, assume that the series of wavelengths includes 501 nm and 502 nm. Instead of calculating a $T_i$ vs. d curve at just 501 nm, this $T_i$ vs. d curve is advantageously calculated by averaging $T_i$ vs. d curves calculated at, for instance, 500 nm, 501 nm, and 502 nm. Further, the $T_i$ vs. d curve at 502 nm is advantageously calculated by averaging $T_i$ vs. d curves calculated at, for instance, 501 nm, 502 nm, and 503 nm. One skilled in the art will appreciate that invention is not limited to this averaging procedure and the range of wavelengths used.

At 503, an optical monitoring wavelength $\lambda_m$ is selected from the series of wavelengths in the transmissive band of the finished filter, thereby identifying a single curve $T_i$ vs. d at $\lambda_m$ from the series of curves computed at 502. The monitoring wavelength $\lambda_m$ is determined based on the contrast of the monitoring signal within each layer. The contrast is defined as the relative range of the monitoring signal within the layer of interest. The higher the contrast, the more robust the process flow of FIG. 5 will be with respect to random signal noise.

Advantageously, the relative separation between the monitoring and cutoff wavelengths should be at least about 2%. Once above 2%, the monitoring wavelength $\lambda_m$ should be chosen to maximize the contrast of each layer. In addition, the optical thickness of the first layer toward the substrate has a significant impact on the signal contrast for the rest of the structure. Therefore, the optical thickness of the first layer should be close to an odd-integer number of quarter-wavelengths at the monitoring wavelength $\lambda_m$.

Having determined the monitoring wavelength $\lambda_m$ at 503, processing advances to 504 where it is determined how the deposition duration for each layer will be calculated. For layers that are predicted to have little error between the designed thickness d and a simulated actual thickness, deposition duration is controlled by optically monitoring transmission levels $T_m$ through the layer during deposition. For the other layers, their deposition durations are controlled using an expected deposition time $t_i$ based upon designed ("theoretical") thickness $d_i$ and deposition rate $r_i$. Accordingly, at 504, the data processor 414 determines which layers are to be optically monitored and which layers are to be timed using an expected deposition time.

To determine which layers will be optically monitored, the data processor 414 enters a simulation mode to simulate deposition of each of the layers of the optical filter. Only the layers that are determined by the simulation to have the least amount of error are selected for optical monitoring. The simulation mode is nearly identical to the process described below with reference to 505 to 522, except that layers are not actually deposited at 505 and 506, the processing described at 508 is skipped, and instead of actually measuring transmission data $T_m$ vs. t at 511, it is generated. $T_m$ vs. t is generated by adding random noise to the theoretical data $T_i$ vs. d at $\lambda_m$ from 502 and 503. In the exemplary embodiment, 0.2% peak-to-peak random noise is used, and the maximum amount of error ("threshold") to select a layer for optical monitoring is to have no more than about 0.2% error from the theoretical thickness di. The error calculation, in this regard, is discussed in more detail below with reference to 518 and 519. The layers that are simulated to exceed the threshold amount of error are flagged to have their deposition duration controlled by the best estimate of the deposition rate $r_i$ for that layer or from an average of the rates of the previous layers of like material (typically 10 to 20 of such layers).

After determining which layers are to be optically monitored at 504, actual deposition of the layers of the LWP filter begins at 505. In particular, the substrate is loaded into the deposition apparatus 400 of FIG. 4, the apparatus is pumped down to a vacuum, and deposition of the first layer (current layer i) is initiated at 506. The expected deposition time $t_i$ for layer i is calculated as the desired thickness $d_i$ divided by the estimated deposition rate $r_i$ for the layer or from an average of the rates of the previous layers of like material at 507. It should be noted, however, that calculation of the expected deposition time $t_i$ at 507 may be calculated prior to beginning actual deposition of the current layer i at 506.

After calculating the expected deposition time $t_i$, it is determined whether the current layer i has been identified as a layer to be optically monitored for controlled deposition duration. If the current layer has not been so identified, deposition of the current layer terminates when the expected deposition time $t_i$ from 507 expires, as shown at 509. After the expected deposition time $t_i$ has expired, processing advances to 521 where the next layer is queued up for deposition, as shown at 510.

If it is determined at 508 that the current layer i is to be optically monitored, the actual transmission $T_m$ is measured at 511 as a function of actual time transpired t until about 95% of the expected deposition time ti has elapsed. Once about 95% of ti has elapsed, a new deposition duration is calculated at 512–520. In particular, at 512, 513, and 514, using the $T_i$ vs. d at $\lambda_m$ curve from 502 and 503, a two-dimensional (2D) array of additional curves is generated by plotting the values of $T_i$ against a 2D array of time vectors $t_{jk}$ In particular, at 513, transmission $T_{ij}$ is generated by plotting $T_i$ against the values $t_j = d/r_j$, where $r_j$ represents, for each j, a deposition rate having a value close to the predicted value $r_i$. That is, the set of all $r_j$ values is a range of values surrounding the predicted value $r_i$. Accordingly, j is an index that counts the number of r values that come from the range surrounding the predicted value $r_i$. At 514, for each value of j, transmission $T_{ijk}$ is generated by plotting $T_{ij}$ against the values $t_{jk} = t_j + \Delta t_k$, where $\Delta t_k$ represents various values used for a uniform time shift.

At 515, it is determined whether there is more than one extremum in the curve $T_i$ vs. d at $\lambda_m$. If there is more than one extremum at 515, then each of the 2D array of curves generated at 512–514, is scaled in two ways at 516. First, the mid-point between the two extrema for each $T_{ijk}$ curve is scaled by a factor so that it equals the mid-point between the two extrema of the measured data $T_m$ vs. t. Second, the maximum and minimum values on each $T_{ijk}$ curve are scaled by scaling uniformly about their mean so that the difference between the maximum and minimum for each curve $T_{ijk}$ is the same as that on the measured curve $T_m$ vs. t. If there is one or no extremum at 515, then the mean of each $T_{ijk}$ curve is scaled at 517 by a uniform factor so that it is equal to the mean of the measured curve $T_m$ vs. t.

After scaling at 516 or 517, processing advances to 518 where error is calculated. For each of the 2D array of generated $T_{ijk}$ curves, the root-mean-square (RMS) error between each $T_{ijk}$ curve and the measured curve $T_m$ vs. t is computed. Typically this computation is performed only for data between about 10% and 95% of the expected deposition time $t_i$. Afterwards, the values of j and k that yield a minimum RMS error at 518 are identified at 519. Therefore, the curve $T_{ijk}$ vs. $t_{jk}$ is taken to be the best approximation of the actual curve $T_m$ vs. t for layer i. At 520, the curve $T_{ijk}$ vs. $t_{jk}$ is compared against the design curve $T_i$ vs. d at $\lambda_m$ from 502 and 503, and the time $t_{jk}$ at which the layer should be terminated is computed. When the measured time t reaches $t_{jk}$, the deposition for the optically monitored layer i is terminated.

After deposition of the current layer i has completed, the apparatus 400 of FIG. 4 is reconfigured at 521 to start depositing the material associated with layer i+1, and the process loops back to 506. However, if all layers of the filter have been deposited, the LWP filter is complete, and processing stops at 522.

Figure 6:
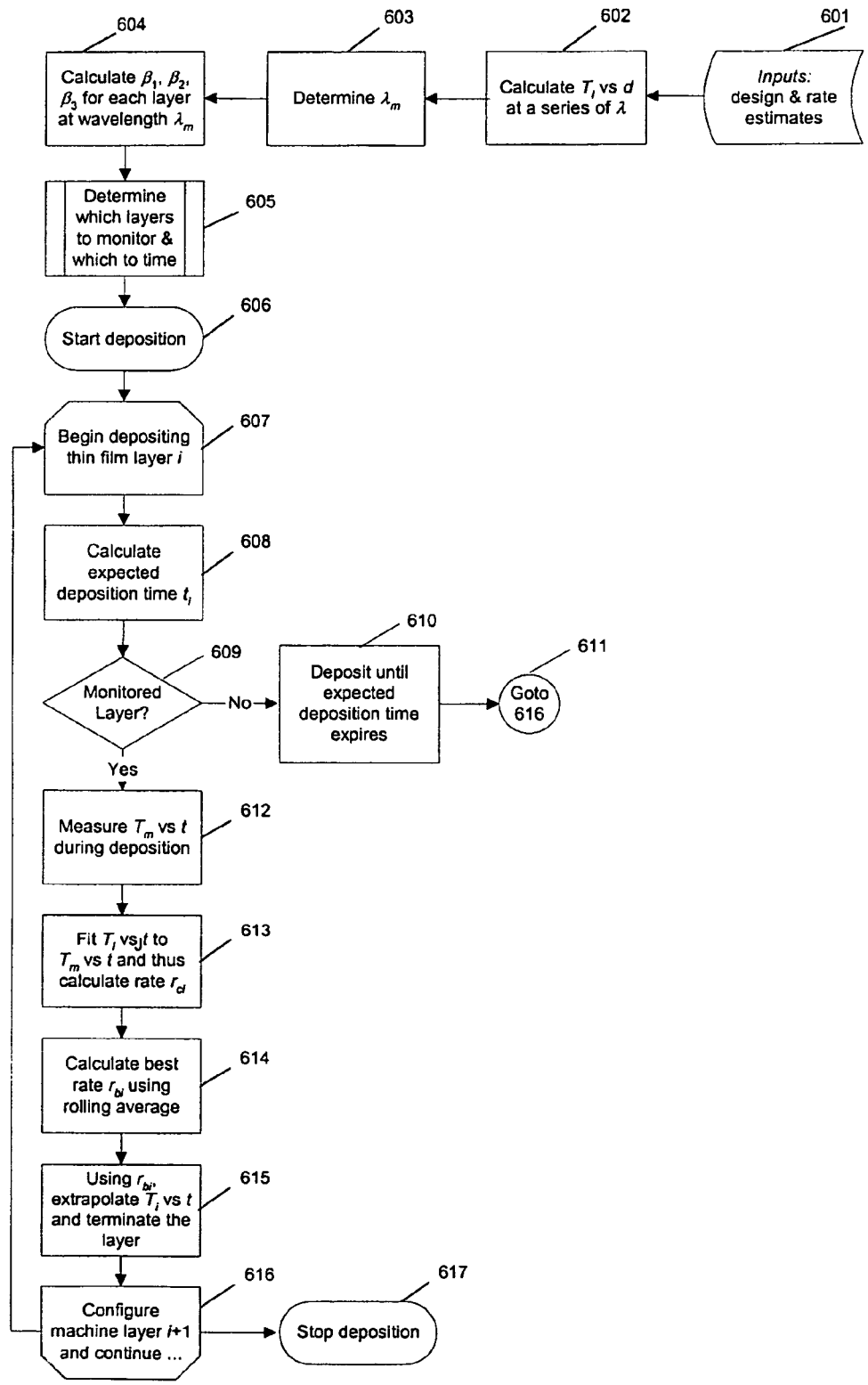
FIG. 6 is a process flow illustrating the process of manufacturing a short-wave-pass filter in accordance with an embodiment of the invention.

Turning now to FIG. 6, the process flow executed by the data processor 414 when manufacturing a short-wave-pass ("SWP") filter according to the exemplary embodiment of the present invention is described. The process illustrated with FIG. 6 is based on the inventor's observation that the inverse of the monitoring trace (i.e., the transmission of the monitoring light as a function of time) within each layer follows a sinusoidal pattern. As will be shown, only four parameters, $\beta_1$, $\beta_2$, $\beta_3$, and $\theta_{m+1}$, are needed to fully describe the behavior of the monitoring trace for each layer.

Assume that at the monitoring wavelength the incident medium, deposited materials, and substrate are all lossless (practically true). At normal incidence, each layer may be described by its characteristic matrix:

$$\begin{bmatrix} \cos\theta & -i\sin\theta/n \\ -in\sin\theta & \cos\theta \end{bmatrix} \quad (1)$$

where n is the refractive index of the layer, $\theta$ is the accumulated phase within the layer, and i in equations 1 through 8 (and only in these equations) is the square root of $-1$, or $i=\sqrt{-1}$. (It should be noted that although this specification is described in the context of light striking a filter at normal incidence, one skilled in the art will appreciate that this invention also applies to polarized light striking a filter at non-normal incidence.) $\theta$ is expressed as:

$$\theta = \frac{2\pi}{\lambda_m} nd \quad (2)$$

where d is the metric thickness of the layer and $\lambda_m$ is the monitoring wavelength. Assuming an assembly of m layers have already been deposited, the transmission of the monitoring light within the $(m+1)^{st}$ layer, the present layer, may be expressed as:

$$T = \frac{4n_a n_s}{H} \quad (3)$$

where T is the level of monitoring signal within the present layer (transmission), and $n_a$ and $n_s$ are the refractive indices of the incident medium and substrate, respectively. H is defined as:

$$H = \beta_1 + \beta_2 \cos 2\theta_{m+1} + \beta_3 \sin 2\theta_{m+1} \quad (4)$$

$\beta_1$, $\beta_2$, and $\beta_3$ are defined as:

$$\beta_1 = \frac{n_a^2 + n_{m+1}^2}{2}\left(|p|^2 + \frac{|q|^2}{n_{m+1}^2}\right) + 2n_a \text{Re}(pq^*) \quad (5)$$

where Re(pq*) is the Real Part of the product of the complex number p and the complex conjugate of the complex number q. p and q are defined in equation (8) below.

$$\beta_2 = \frac{n_a^2 - n_{m+1}^2}{2}\left(|p|^2 - \frac{|q|^2}{n_{m+1}^2}\right) \quad (6)$$

$$\beta_3 = \left(\frac{n_a^2}{n_{m+1}} - n_{m+1}\right)\text{Im}(p^*q) \quad (7)$$

where $\theta_l$ is accumulated phased in the $l_{th}$ layer. Im(pq*) is the Imaginary Part of the product of the complex conjugate of the number p and the complex number q. p and q are defined as:

$$\begin{bmatrix} p \\ q \end{bmatrix} = \prod_{l=1}^{m} \begin{bmatrix} \cos\theta_l & -i\sin\theta_l/n_l \\ -in_l\sin\theta_l & \cos\theta_l \end{bmatrix} \begin{bmatrix} 1 \\ n_s \end{bmatrix}. \quad (8)$$

Based on the above equations, the relationship between the monitoring trace T and the accumulated phase $\theta_{m+1}$ within the present layer is established. The inverse of the monitoring trace is sinusoidal, as demonstrated by the expression for H. Further, only four parameters, $B_1$, $\beta_2$, $\beta_3$, and $\theta_{m+1}$, are needed to fully describe the behavior of the monitoring trace in the present layer. Because the thickness d=r×t, where r is the deposition rate and t is the deposition time, a relationship between T and r or t is also established. If the deposition rate is constant, the accumulated phase $\theta_{m+1}$ is proportional to the deposition rate. Therefore, during the deposition process, the deposition rate may be retrieved with high accuracy by fitting the in-situ measurement of the monitoring trace to the four parameters.

With this groundwork, the process of FIG. 6 will now be described in greater detail. However, prior to initiating the process of FIG. 6, a design for the SWP filter is prepared. The process of designing a SWP edge filter is very similar to that of LWP filter, with several exceptions. First, the initial structure is (0.5L H 0.5L)^N. Second, the shorter wavelength edge of the QW stopband should be aligned with the desired cutoff wavelength. Third, if the first layer next to the substrate is a low index layer, it should be removed. Finally, it is advantageous, but not necessary, to artificially increase the optical thickness of the first layer.

With the design of the SWP filter at hand, the design data, as well as deposition rate data are received as input at 601. The input data has the content and format described with reference to 501 in FIG. 5. At 602, the transmission curves $T_i$ vs. d at a series of wavelengths for each ith layer are calculated as described with reference to 502 in FIG. 5. Choosing the best monitoring wavelength $\lambda_m$ at 603 is similar to that described with reference to 503 in FIG. 5, except that it may be more advantageous to select $\lambda_m$ by taking an average of a series of wavelengths than it is for an LWP filter.

At 604, the β parameters are calculated for each layer at wavelength $\lambda_m$ using equations (1) through (8) described above. At 605, a determination is made as to which layers should have their deposition duration controlled by optical monitoring and which layers should have their deposition duration timed using an expected deposition time $t_i$. Such determination is made by simulating the deposition of each layer and selecting the layers having the least amount of simulated error to be optically monitored. Deposition of the other layers will be timed using the expected deposition time $t_i$.

The simulation process occurs by executing the processes of 606 to 617 as described below. However, actual deposition does not occur at 606 and 607, the processing described at 609 is skipped, and instead of measuring $T_m$ vs. t at 612, it is generated. $T_m$ vs. t is generated by adding random noise to the theoretical data $T_i$ vs. d at $\lambda_m$ from 602 and 603. In the exemplary embodiment, 0.2% peak-to-peak random noise is used, and the maximum amount of error ("threshold") to select a layer for optical monitoring is to have no more than about 0.5% error from the theoretical resulting thickness $d_i$. The error calculation, in this regard, is described in more detail below with reference to 613. The layers that are simulated to exceed the threshold amount of error are flagged to have their deposition duration controlled by the best estimate of the deposition rate $r_i$ for that layer or from an average of the rates of the previous layers of like material (typically 10 to 20 such layers).

Having determined which layers are to be optically monitored at 605, deposition begins at 606. In particular, a substrate is loaded into the deposition apparatus 400, the apparatus 400 is pumped down to vacuum, and deposition of the first layer (current layer i) is initiated at 607. At 608, the expected deposition time $t_i$ for layer i is calculated as the desired thickness $d_i$ divided by the estimated deposition rate for the layer $r_i$ or from an average of the rates of the previous layers of like material. It should be noted, however, that calculation of the expected deposition time $t_i$ at 608 may be calculated prior to beginning actual deposition of the current layer i at 607.

At 609 it is determined whether the current layer i was identified as an optically monitored layer at 605. If not, deposition occurs until the expected deposition time $t_i$ expires, and the deposition apparatus is configured for deposition of the next layer, as shown at 610, 611, and 616. If it is determined that the current layer i is an optically monitored layer at 609, the transmission $T_m$ of the current layer is measured at 612 as a function of actual time t transpired, thereby producing a measured curve $T_m$ vs. t, until about 95% of time $t_i$ has elapsed. Once about 95% of the time $t_i$ has elapsed, a new layer time is calculated at 613 to 615.

To elaborate, at 613, $T_i$ vs. t (where t=d/r and $T_i$ vs. d at $\lambda_m$ was calculated and selected at 602 and 603, respectively) is fit to the measured curve $T_m$ vs. t from 612. The $T_i$ vs. t curve is fit to the measured curve $T_m$ vs. t by using a function that minimizes the error between the two curves by varying $\beta_1$, $\beta_2$, $\beta_3$, and the deposition rate r. An example of such a function is the Levenberg-Marquardt method implemented under the name "mrqmin( )" in the book *Numerical Recipes in C: The Art of Scientific Computing*, by Press, W. H.; Teukolsky, S. A.; Vetterling, W. T.; and Flannery, B. P., 2nd ed., Cambridge University Press, Cambridge, 1995. These calculations result in a calculated deposition rate for the current layer i, or $r_{ci}$.

Because of noise in the overall system and the sensitivity of the high-performance SWP filters to small layer-thickness errors, the calculated rates $r_{ci}$ tend to be insufficiently accurate if used directly. Therefore, a "best rate" for each layer, $r_{bi}$, is calculated at 614 as the average of the calculated rate $r_{ci}$ and calculated rates $r_{cj}, r_{c,j+2}, \ldots, r_{c,i-4}, r_{c,i-2}$ for a certain number (i−j)/2 of previous layers of the same material. In other words, the best rate is a rolling average of the current and previous rates from layers of like material within a certain window. Typically, this window includes about 20 layers.

At 615, the best rate $r_{bi}$ is used to calculate the layer termination time $t_t=d/r_{bi}$, and the layer is terminated when the clock reaches this time. Once deposition of the current layer is complete, the deposition apparatus 400 of FIG. 4 is reconfigured at 616 to start depositing the material associated with the next layer i+1, and the process loops back to 607. However, if all layers have been deposited, manufacturing of the SWP filter is compete, and the process ends at 617.

Having described the processes of making LWP and SWP edge filters, the processes of making a laser-line filter ("LLF") according to an embodiment of the invention will now be described. The filters according to this embodiment are based on a single-substrate approach, with hard coatings on one or both sides of the substrate. The filters are based on a multi-cavity Fabry-Perot type coating to define the passband and blocking section near the passband. Furthermore, additional blocking at wavelengths further away from the passband may be provided by one or more additional, strictly dielectric, coatings, where, advantageously, no metals are used. These one or more additional coatings are referred to herein as "extended blocking layers."

Figure 7:
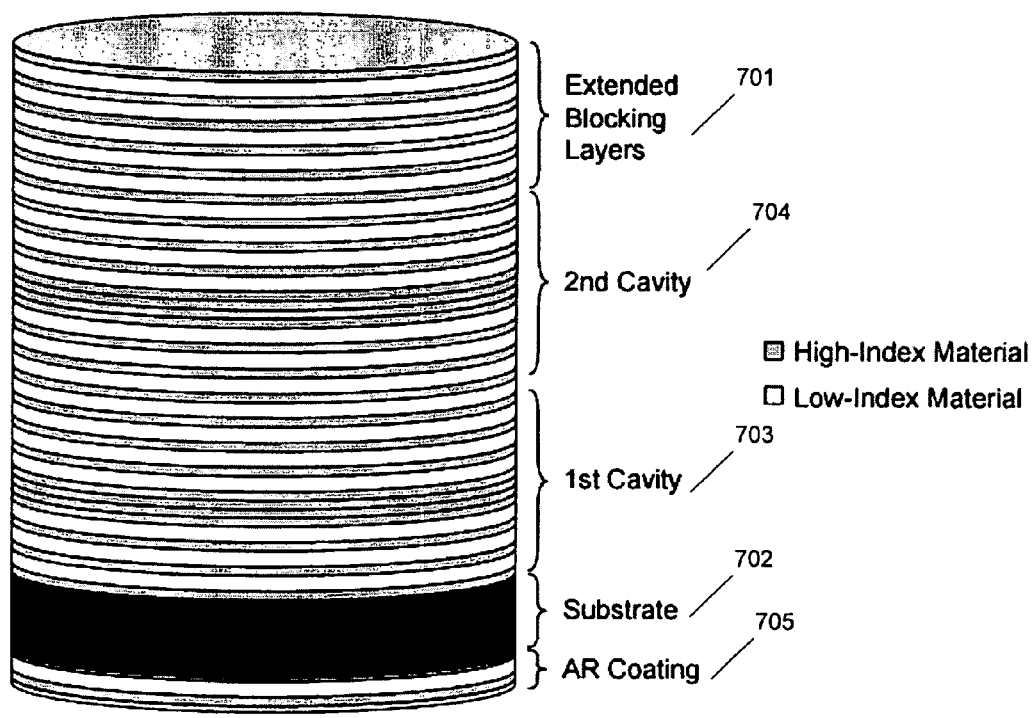
FIG. 7 illustrates a first structure of a laser-line filter in accordance with an embodiment of the invention.

An LLF according to one embodiment of the present invention is illustrated with FIG. 7. As shown in FIG. 7, the extended blocking layers 701 are located on one side of the substrate 702 and are incorporated into the same coating that contains layers defining the multi-cavity Fabry-Perot structure 703, 704, for example. Advantageously, an anti-reflection (AR) coating 705 may be applied to the opposite side of the substrate 702 to reduce losses due to reflections off of this surface. It should be noted that FIG. 7 is used merely as an illustration, is not to scale, and the number of layers is not necessarily accurate. Accordingly, one skilled in the art will appreciate that, typically, actual filters have more than two Fabry-Perot cavities and more extended blocking layers than those shown in FIG. 7.

When fabricating LLFs according to the embodiment illustrated, for example, with FIG. 7, the following applies. For the layers of the coating that form the multi-cavity Fabry-Perot filter (703, 704, for example), which are deposited first, the method for making LWP filters, described herein, may be used. However, after executing step 514, processing advances directly to 516 and then to 518 (that is, no decision is made at 515, and 517 is not performed). Then, for the layers of the coating that are for extended blocking (701, for example), these layers are not monitored, and are terminated exclusively based on the calculated time. In other words, after step 507, processing proceeds directly to step 509 and then step 510, thus jumping to step 521.

Figure 8:
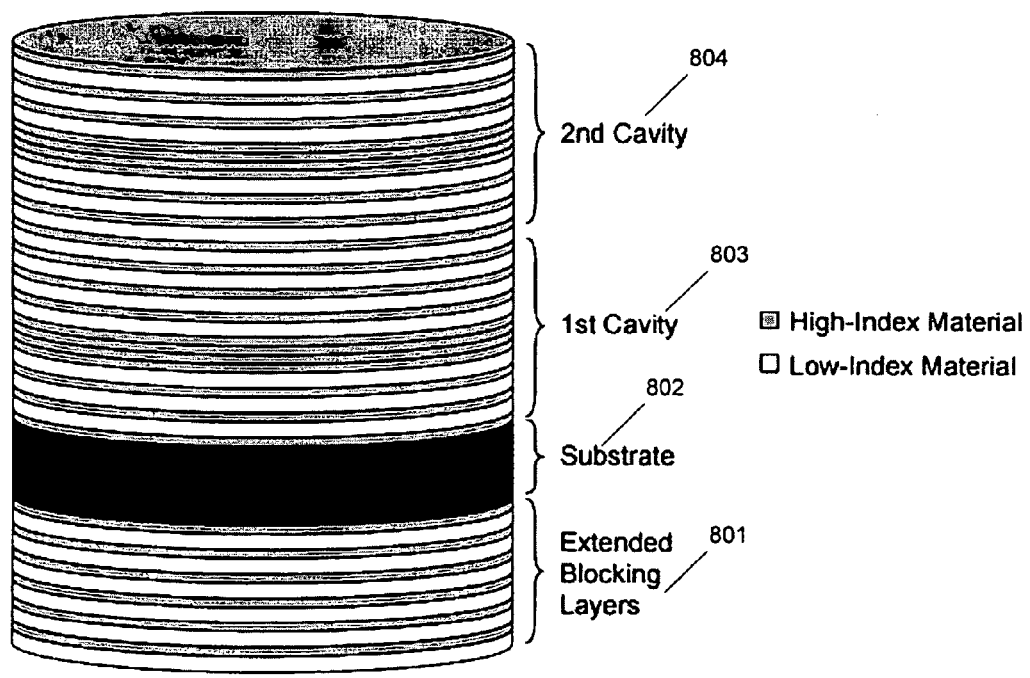
FIG. 8 illustrates a second structure of a laser-line filter in accordance with an embodiment of the invention.

An LLF according to another embodiment of the present invention is illustrated with FIG. 8. As shown in FIG. 8, the extended blocking layers 801 are not incorporated into the multi-cavity Fabry-Perot coating 803, 804, for example, and are located on the opposite side of the substrate 802 than the multi-cavity Fabry-Perot coating 803, 804. (However, one or more extended blocking layers may be incorporated into the multi-cavity Fabry-Perot coating on one side of the substrate, and other extended blocking layers may also be coated onto the opposite side of the substrate). As with FIG. 7, FIG. 8 is used merely as an illustration, is not to scale, and the number of layers is not necessarily accurate. Accordingly, one skilled in the art will appreciate that, typically, actual filters have more than two Fabry-Perot cavities and more extended blocking layers than those shown in FIG. 8.

When fabricating LLFs according to the embodiment illustrated, for example, with FIG. 8, the following applies. The multi-cavity Fabry-Perot coating (803, 804, for example) is formed as described in regard to the embodiment illustrated with FIG. 7. For the extended blocking layers (801, for example) on the side of the substrate 802 opposite to the multi-cavity Fabry-Perot coating (803, 804, for example), the method for making SWP filters, described herein, may be used.

Although the exemplary methods have been described in the context of manufacturing optical edge filters and laser-line filters, those skilled in the art will appreciate that such methods apply to manufacturing other types of optical filters, or may easily be modified to manufacture other types of optical filters. For instance, the methods are useful for any filter having even a single layer of critical thickness, such as a Fabry-Perot interferometer, where the layer of critical thickness is the resonance cavity. Further, although the exemplary methods are disclosed as having a particular sequence of events, one skilled in the art will appreciate that many of these events may occur in a different order without departing from the scope of the invention. Accordingly, the methods of the present invention are not limited to producing optical edge and laser-line filters and are not limited to the particular ordering of events described.

C. The Improved Filters

Figure 3A:
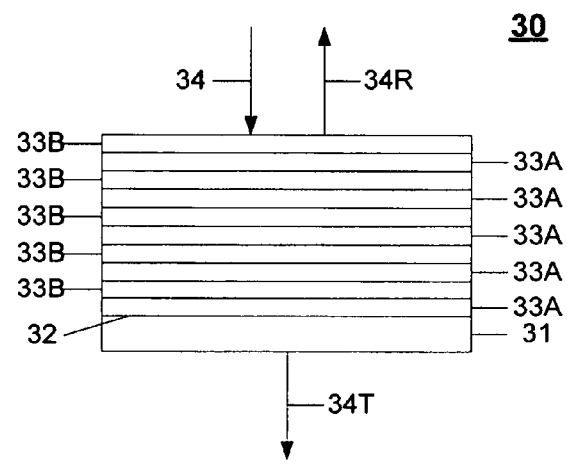
FIG. 3A is a schematic drawing illustrating the structure of a conventional optical edge filter.
Figure 3B:
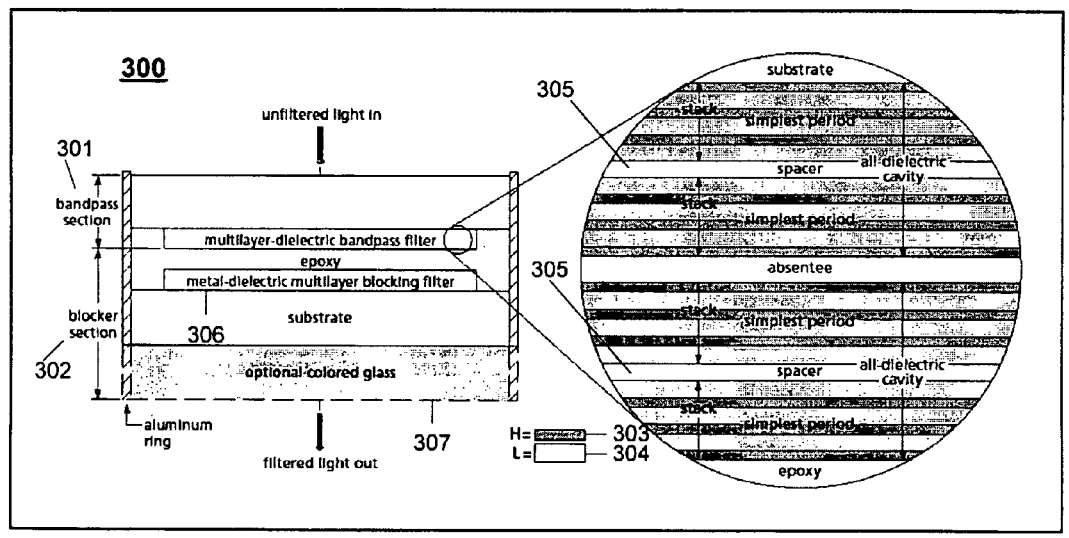
FIG. 3B is a schematic drawing illustrating the structure of a conventional laser-line filter.

The improved edge filters have the general structure schematically illustrated in FIG. 3 but are made by the processes described herein in connection with FIGS. 5 and 6. In essence, the filters comprise a transparent substrate advantageously having a pair of optically flat planar major surfaces and a plurality of alternating layers of relatively high index and relatively low index materials. The materials are hard oxide coating materials such as $SiO_2$, $Ta_2O_5$, $Nb_2O_5$, $HfO_2$, $TiO_2$, and $Al_2O_5$.

The edge filters differ from conventional edge filters primarily in the number of layers (typically more than 100) and in that the thicknesses of layers deposited are controlled by the processes of FIGS. 5 and 6 to produce an edge steepness less than about 0.8%. The edge steepness, in this regard, is measured by dividing (a) the edge width from the 50% transmission wavelength to the optical density 6 ("OD6") wavelength by (b) the 50% transmission wavelength. Accordingly, lower steepness values indicate greater slope. Optical density ("OD") is a measure of the blockage encountered by impinging light and is defined as follows:

$$OD = -\log_{10}(T) \quad (9)$$

where T is the transmittance having a value between zero and one. OD6 therefore corresponds to a transmittance of $10^{-6}$.

Advantageously the edge steepness, as defined above, is less than about 0.463%. However, the edge steepness may be increased if necessary. In addition, the filters so made exhibit an average transmission above about 93% and preferably above at least 95% with ripple below about 2% in the operating range. In the case of a filter for a 532 nanometer laser-line, the operating range is approximately 200 nm from the wavelength at which the filter reaches full transmission. One skilled in the art will appreciate that the operating range is larger with filters for laser-lines at higher wavelengths. Transmission of the filters does not drop below 93% and preferably 95% in the operating range. The filters thus provide performance exceeding that of the highest performing conventional soft-coating filters with a more robust and durable hard-coated structure.

The edge filters can be constructed with an edge wavelength as short as 325 nm and as long as 1064 nm. It is contemplated that this range may be extended from as low as 250 nm to as high as 2,000 nm using the materials listed above.

The improved laser-line filters made by the processes disclosed herein exhibit increased transmission, steepness, and blocking in the vicinity of the passband over prior art laser-line filters, yet offer considerable wideband blocking away from the passband.

The invention can now be more clearly understood by consideration of the following specific examples.

EXAMPLE 1

Long-Wave-Pass Edge Filter

A steep-edge LWP filter for a 532 nanometer laser-line was designed and fabricated in accordance with the LWP design strategy described above. The filter is to block the 532 nanometer laser light and light of lesser wavelength but to transmit light of longer wavelength. Appendix A gives the layer structure of the design. The optical thickness is given in units of quarter wavelengths (QWs) at the monitoring wavelength of 568 nanometers. The layers are counted from the substrate outward toward air. The substrate is BK7 glass, marketed by vendors such as Schott Glass. The design has 180 layers with a total metric thickness of 12.7 micrometers.

Figure 9:
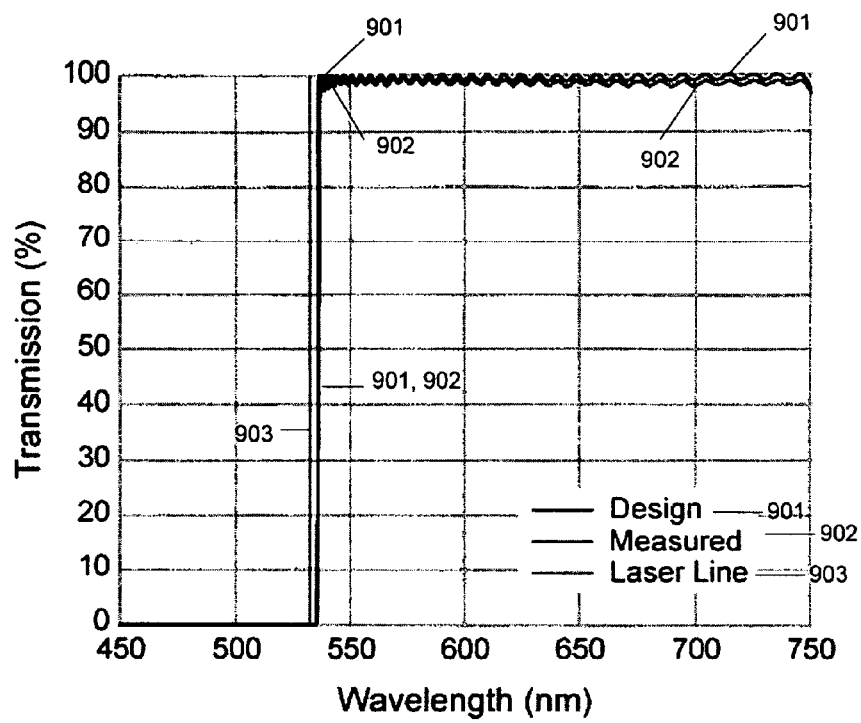
FIGS. 9 and 10 are transmission and optical density spectra, respectively, of an LWP filter fabricated in accordance with an embodiment of the invention.

FIG. 9 shows the theoretical and measured transmission spectra of the resulting 532 nm LWP edge filter in accordance with an embodiment of the invention. Curve 901 is the theoretical spectrum, curve 902 is the measured spectrum and curve 903 is the laser wavelength line at 532 nm.

Figure 10:
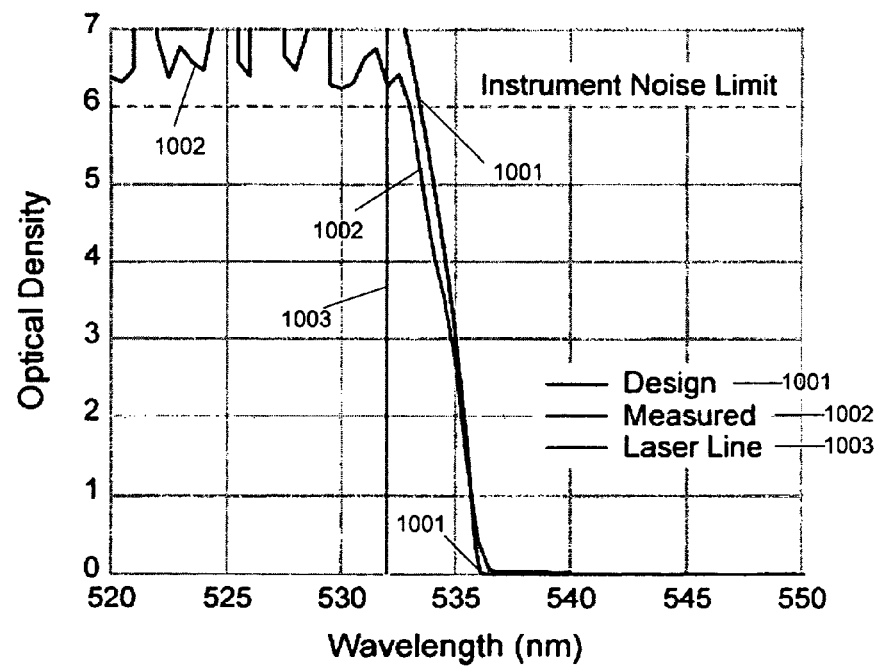

FIG. 10 illustrates the optical density spectrum of the 532 nm LWP filter. As previously discussed, optical density (OD) is a measure of the blockage encountered by impinging light. Curve 1001 is the theoretical OD spectrum, curve 1002 is the measured OD spectrum, and curve 1003 is the 532 nm laser line. It is noteworthy that the filter edge is so steep that it is difficult to measure with standard spectrophotometry equipment. The apparent "kink" between OD3 and 4 is not real, but rather is produced by the measuring instrument.

EXAMPLE 2

Short-Wave-Pass Edge Filter

A steep-edge SWP filter was designed and fabricated in accordance with the SWP design strategy described above.

The filter is to block the 532 nanometer laser light and light of greater wavelength but to transmit light of shorter wavelength. Appendix B provides the layer structure of the design. The optical thickness is given in QWs at the monitoring wavelength of 510 nm. The substrate is BK7 glass. The design has 180 layers with a total metric thickness of 15.1 micrometers.

Figure 11:
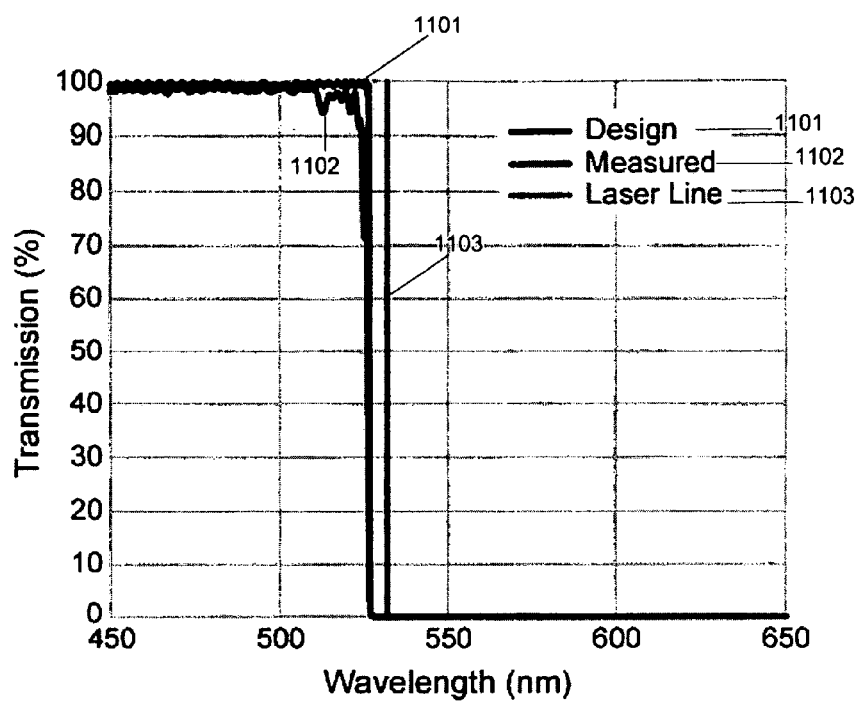
FIGS. 11 and 12 are transmission and optical density spectra, respectively, of an SWP filter fabricated in accordance with an embodiment of the invention.

FIG. 11 illustrates the theoretical and measured transmission spectra 1101 and 1102, respectively, of the realized SWP filter. The laser-line at 532 nm is shown at 1103.

Figure 12:
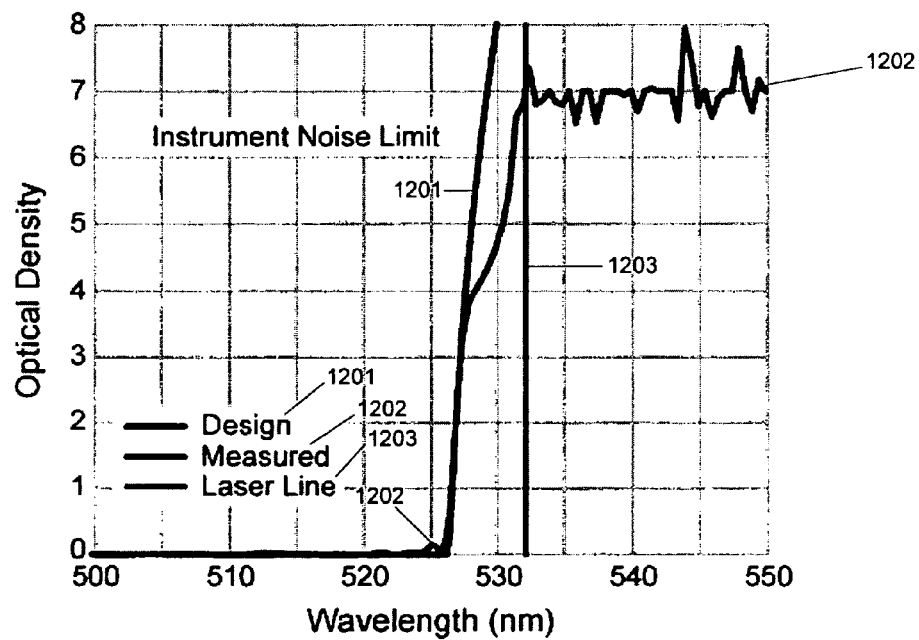

FIG. 12 shows the theoretical and measured optical density spectra 1201 and 1202, respectively, and the laser-line 1203. The apparent "kink" that occurs between about OD 4 and 5 is due to the limitations of the measuring instrument, not the filter.

EXAMPLE 3

First Example of a Laser-Line Filter

Figures 13, 532:
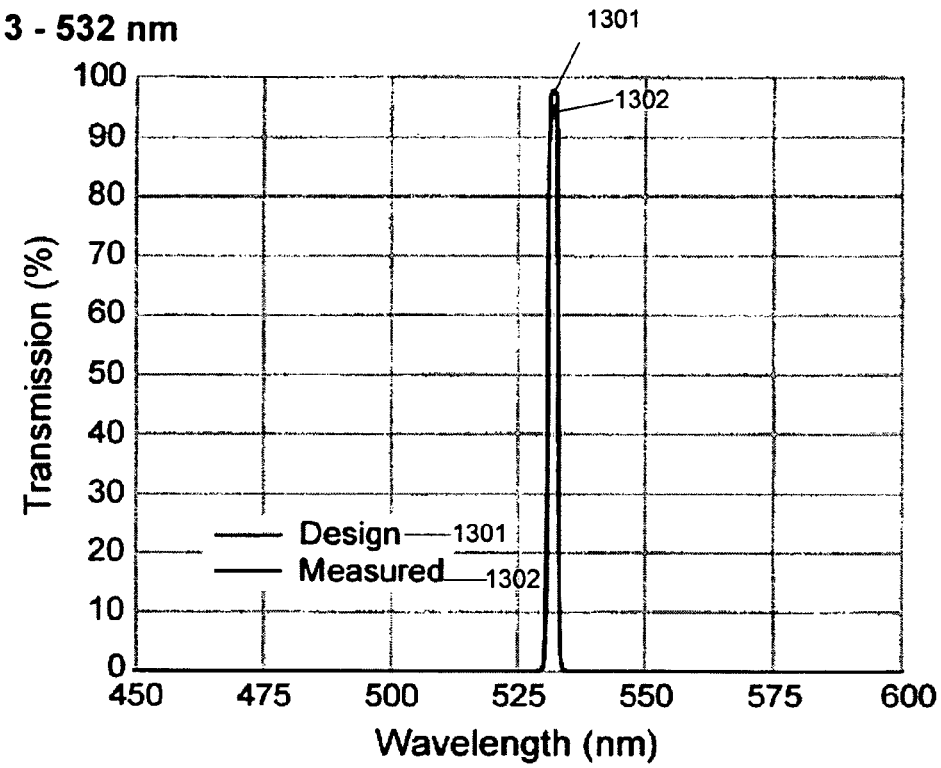
FIGS. 13 and 14 illustrate transmission spectra of a 532 nm laser-line filter and a 785 nm laser-line filter fabricated in accordance with an embodiment of the invention.

A laser-line filter having a combined multi-cavity Fabry-Perot and extended blocking coating on one side of the substrate and an anti-reflective coating on the other side of the substrate (FIG. 7, for example) was manufactured according to the processes described herein. This filter was a 532 nm filter whose coating structure is given in Appendix C. A graph showing both the designed 1301 and measured 1302 transmission spectrum for this filter is shown at FIG. 13.

EXAMPLE 4

Second Example of a Laser-Line Filter

Figures 14, 785:
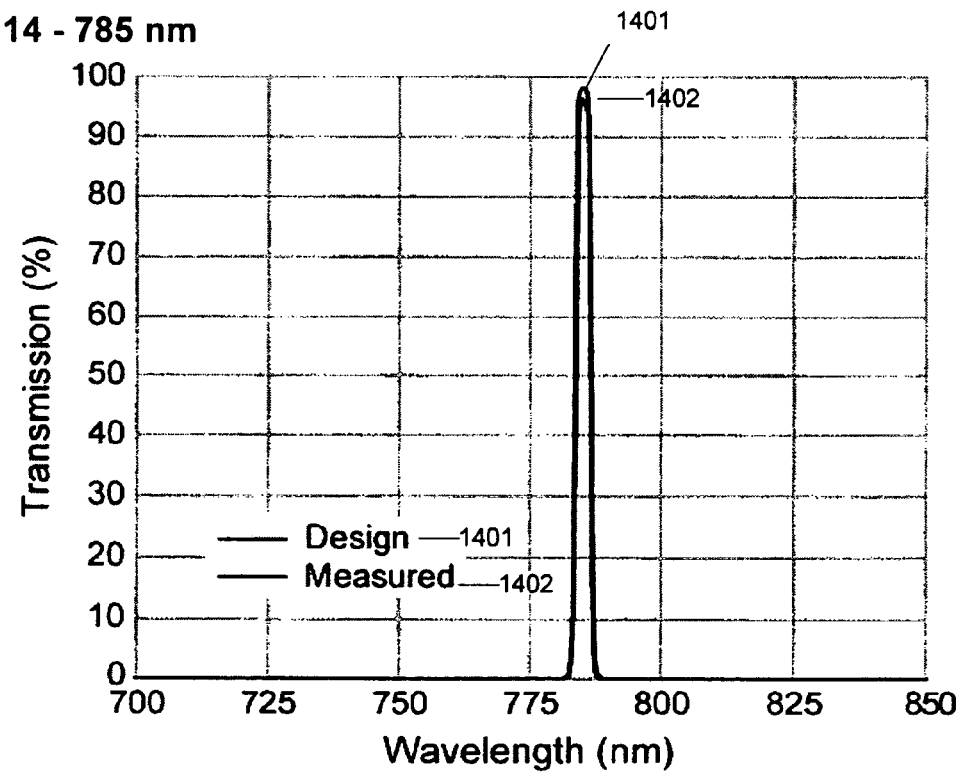

A laser-line filter having a multi-cavity Fabry-Perot filter on one side of the substrate and extended blocking layers on the other side of the substrate (FIG. 8, for example) was manufactured according to the processes described herein. This filter was a 785 nm filter whose coating structure is given in Appendix D. A graph showing both the designed 1401 and measured 1402 transmission spectrum for this filter is shown at FIG. 14.

EXAMPLE 5

Third Example of a Laser-Line Filter

Figures 15, 325:
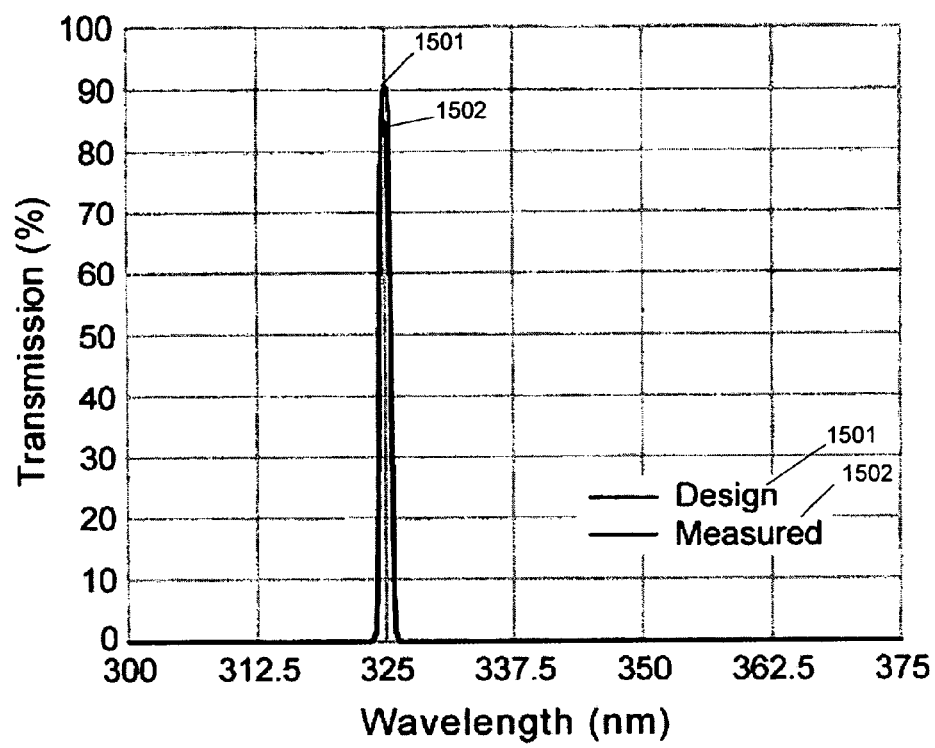
FIGS. 15 and 16 illustrate transmission spectra of a 325 nm laser-line filter and a 980 nm laser-line filter fabricated in accordance with an embodiment of the invention It is to be understood that these drawings are for illustrating the concepts of the invention and, except for data graphs, are not to scale.

A 325 nm laser-line filter having a structure according to the embodiment of FIG. 8 was manufactured according to the processes described herein. The coating structure of this filter is similar to that given in Appendix D, however, the layer thicknesses in Appendix D were scaled by a factor of the ratio of the laser-line wavelengths, or 325/785. A graph showing both the designed 1501 and measured 1502 transmission spectrum for this filter is shown at FIG. 15.

EXAMPLE 6

Fourth Example of a Laser-Line Filter

Figures 16, 980:
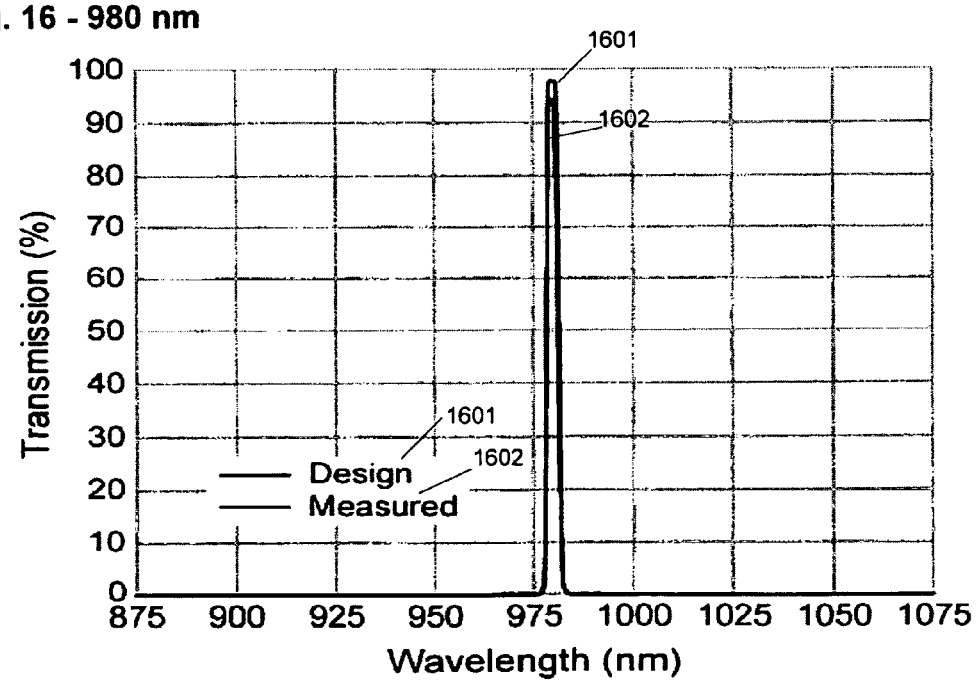

A 980 nm laser-line filter having a structure according to the embodiment of FIG. 8 was manufactured according to the processes described herein. The coating structure of this filter is similar to that given in Appendix D, however, the layer thicknesses in Appendix D were scaled by a factor of the ratio of the laser-line wavelengths, or 975/785. A graph showing both the designed 1601 and measured 1602 transmission spectrum for this filter is shown at FIG. 16.

Performance of Inventive Filters

As compared with conventional edge filters, the edge filters of the invention provide substantially higher edge steepness and passband transmission. Table 1 below presents a comparison between the inventive filters and the best known examples of conventional soft-coated and hard-coated thin-film edge filters. The data in Table 1 are from filters designed to block a 532 nm laser, where the 50% transmission wavelength is 537 nm. Accordingly, steepness (in percentage) is calculated as Edge Width divided by 537 nm.

TABLE 1

|  | Hard-Coated | Soft-Coated | Inventive |
| --- | --- | --- | --- |
| Edge Width (50% to OD4) | ≈3 nm* | ≈4 nm* | <1.4 nm |
| Edge Steepness (50% to OD4) | ≈0.556% | ≈0.741% | <0.259% |
| Edge Width (50% to OD6) | ≈5 nm* | ≈6 nm** | <2.5 nm |
| Edge Steepness (50% to OD6) | ≈0.926% | ≈1.111% | <0.463% |
| Laser-Line Attenuation (OD) | >6.0 | >5.0 | >6.0 |
| Average Transmission | Approx 90% | Approx 85% | >95% and <= approx. 99% |

*Estimated specification
**Edge width for 50% to OD5 (necessarily less than Edge Width for 50% to OD6)

As can be seen from the table, the filters of the present invention provide an improvement in edge steepness and a reduction of optical loss in the transmission band (optical loss defined as 100%−Average Transmission).

In addition, the inventive edge filters provide a substantial improvement in reliability and durability over soft-coated thin-film filters (the highest performing conventional filters) because the inventive filters are made exclusively with hard oxide glass, whereas soft-coated filters contain soft salts and organic materials susceptible to damage by humidity and temperature extremes.

Table 2 illustrates the performance characteristics of the inventive laser-line filters. As shown in Table 2, the laser-line filters have an extremely high transmission in the passband (greater than 90%), an extremely narrow transmission bandwidth, and achieve blocking with an optical density (OD) greater than 5 at wavelengths that differ from the laser wavelength by less than 1% of the laser wavelength.

TABLE 2

| Specification | Values |
| --- | --- |
| Transmission | >90% and <99% in the passband |
| Typical Bandwidth | FWHM = 0.31% of $\lambda_c$  $\lambda_c$ is the design laser |
| Maximum Bandwidth | FWHM = 0.7% of $\lambda_c$  wavelength (nm) |
| Blocking | OD > 5 from $\lambda_c$ ± 1% to 4500 cm$^{-1}$ (red shift) & 3600 cm$^{-1}$ (blue shift) |
|  | OD > 6 from $\lambda_c$ ± 1.5% to 0.92x$\lambda_c$ and 1.10x$\lambda_c$ |
| Angle of Incidence | 0.0 ± 2.0° |
| Temperature Dependence | <5 ppm/° C.     <0.003 nm/° C. at 532 nm |
| Physical Dimensions | Diameter 12.5 mm; Thickness 3.5 mm; Black-Anodized Al Ring |

The data in Table 2 are from a 532 nm and a 785 nm laser-line filter discussed above with respect to Example 3 and Example 4, respectively. However, laser-line filters at wavelengths between 532 nm and 785 nm produced according to embodiments of the present invention exhibit the same performance characteristics as those shown in Table 2. Further, laser-line filters at wavelengths between 400 nm and 1100 nm produced according to embodiments of the present invention either have been actually or theoretically demonstrated to exhibit the same performance characteristics as those shown in Table 2. Further still, laser-line filters at wavelengths below 400 nm down to 325 nm produced according to the embodiments of the present invention have been demonstrated to produce the same performance characteristics as those shown in Table 2, except that the transmission in the passband is slightly lower-manufacturable specifications of passband transmission greater than 85% and less than 98% at 363.8 nm and greater than 80% and less than 97% at 325 nm have been proven. One having ordinary skill in the art will appreciate that the upper bound of the passband transmission is bound by physical limitations, and may exhibit a theoretical value of 100%.

D. Applications of the Filters

Figure 1A:
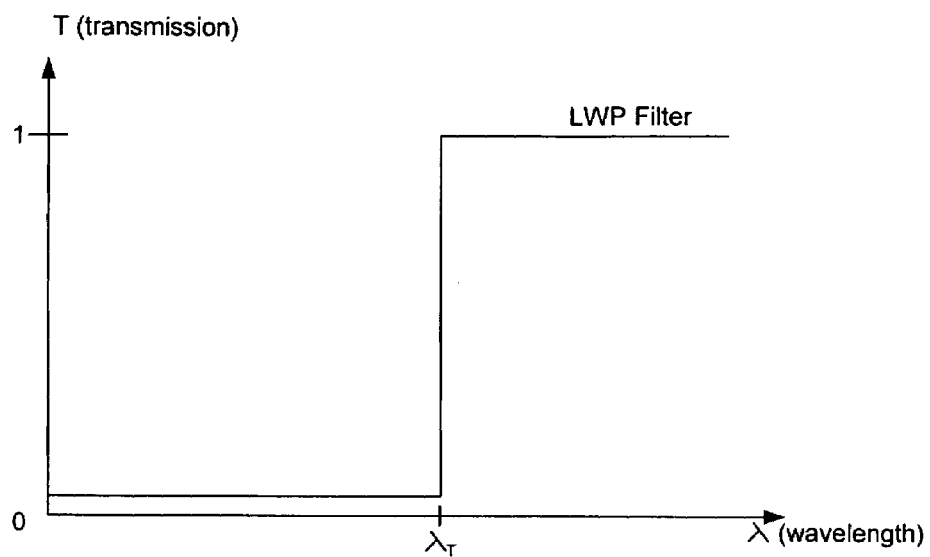
FIGS. 1A and 1B are schematic graphical illustrations showing the spectral transmission of long-wave-pass and short-wave-pass optical edge filters, respectively.
Figure 1B:
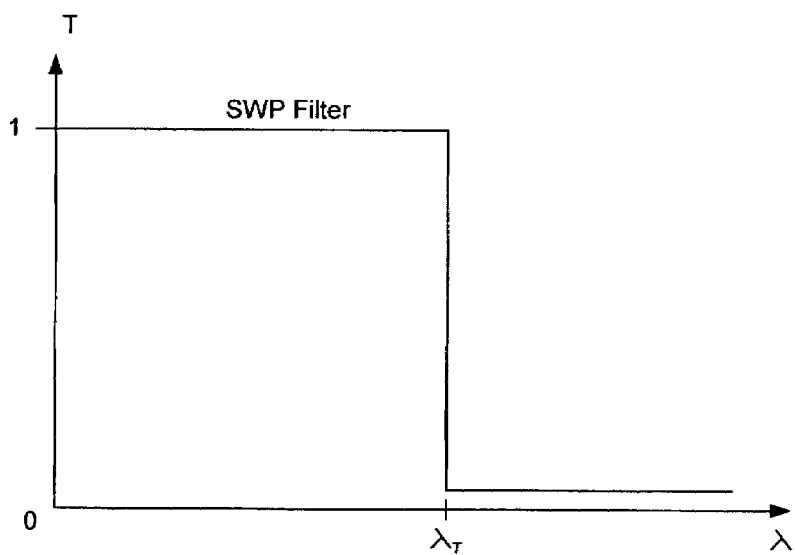
Figure 1C:
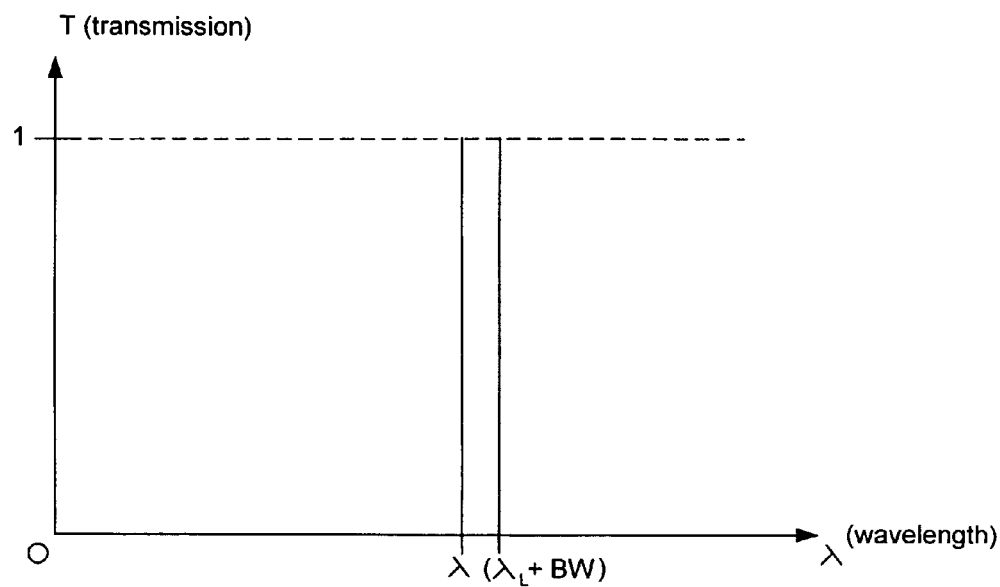
FIGS. 1C and 1D are schematic graphical illustrations showing the spectral transmission of an ideal and realistic laser-line filter, respectively.
Figure 1D:
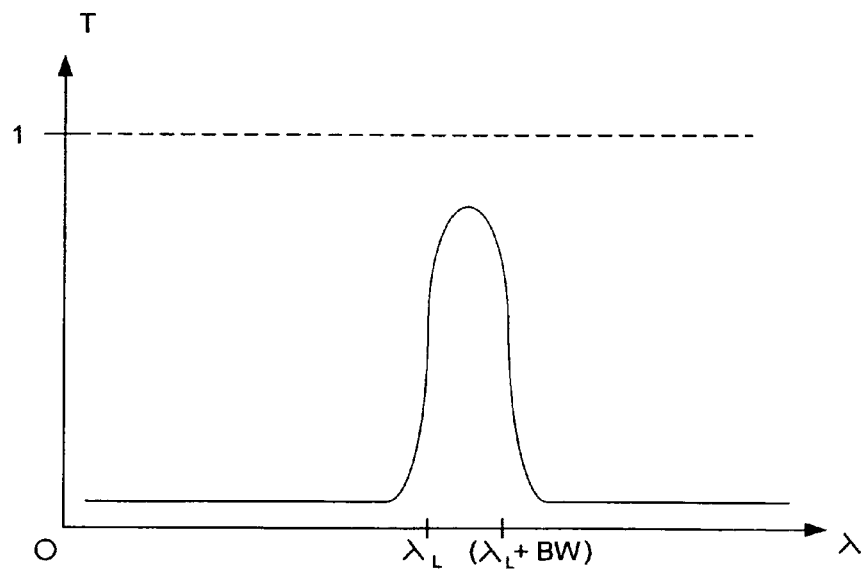
Figure 2:
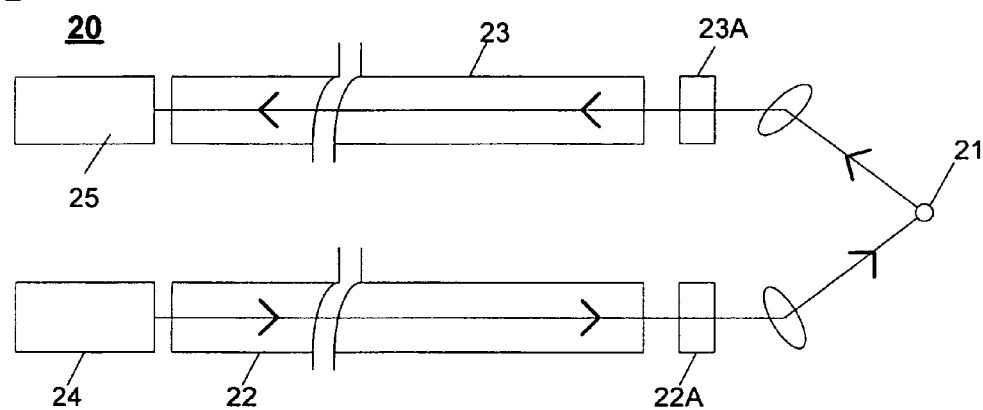
FIG. 2 is a schematic diagram of a conventional Raman probe.

The inventive filters can improve the performance of a variety of optical analysis systems that excite a sample of material with light of a first wavelength to produce a measurable or viewable response of light at a second wavelength different from the first. Such systems, which include Raman spectroscopy and fluorescence spectroscopy, are typically of the construction schematically shown in FIG. 2. They comprise a source of excitation light, an optical path coupling the excitation light to the sample, and a first filter in the path between the source and the sample for blocking light at some wavelengths different from the desired excitation light wavelengths. They also include an optical path coupling the optical response light from the sample to an analyzer or viewer, and a second filter in the path between the sample and the analyzer or viewer for blocking some light other than the optical response. As previously discussed, the first filter may be a laser-line filter. The first and/or second filters may also be long-wave-pass and/or short-wave-pass optical edge filters. It is also possible that one of the filters, e.g. the second, can be a notch filter.

One or more optical edge filters in accordance with an embodiment of the invention can substantially improve the performance of such optical analytical systems. The greater steepness of edge slope permits return of response wavelengths closer to the excitation wavelength providing an increase in the information content of the returned response. For example, Raman lines with extremely small Raman shifts (i.e. very close to the laser wavelength) can be seen with the filters of the present invention, and would otherwise be swamped by the strong laser signal and therefore not measurable. The reduction in transmission loss means that the enhanced information return response will be at higher brightness, and the greater hardness and durability of the inventive filters permits a more robust and versatile instrument.

It is to be understood that the exemplary embodiments are merely illustrative of the present invention and that many variations of the above-described embodiment can be devised by one skilled in the art without departing from the scope of the invention. It is therefore intended that all such variations be included within the scope of the following claims and their equivalents.

APPENDIX A

| Layer # | Material | Optical Thickness | Metric Thickness (nm) |
|---|---|---|---|
| 1 | Ta2O5 | 2.5790 | 171.93 |
| 2 | SiO2 | 0.7851 | 74.97 |
| 3 | Ta2O5 | 0.7323 | 48.82 |
| 4 | SiO2 | 0.7163 | 68.40 |
| 5 | Ta2O5 | 0.8253 | 55.02 |
| 6 | SiO2 | 0.8398 | 80.19 |
| 7 | Ta2O5 | 0.8490 | 56.60 |
| 8 | SiO2 | 0.7960 | 76.01 |
| 9 | Ta2O5 | 0.8058 | 53.72 |
| 10 | SiO2 | 0.8080 | 77.15 |
| 11 | Ta2O5 | 0.8513 | 56.75 |
| 12 | SiO2 | 0.8356 | 79.79 |
| 13 | Ta2O5 | 0.8351 | 55.67 |
| 14 | SiO2 | 0.8029 | 76.67 |
| 15 | Ta2O5 | 0.8280 | 55.20 |
| 16 | SiO2 | 0.8286 | 79.12 |
| 17 | Ta2O5 | 0.8510 | 56.73 |
| 18 | SiO2 | 0.8276 | 79.03 |
| 19 | Ta2O5 | 0.8295 | 55.30 |
| 20 | SiO2 | 0.8124 | 77.57 |
| 21 | Ta2O5 | 0.8402 | 56.01 |
| 22 | SiO2 | 0.8333 | 79.57 |
| 23 | Ta2O5 | 0.8466 | 56.44 |
| 24 | SiO2 | 0.8209 | 78.39 |
| 25 | Ta2O5 | 0.8324 | 55.49 |
| 26 | SiO2 | 0.8202 | 78.32 |
| 27 | Ta2O5 | 0.8441 | 56.27 |
| 28 | SiO2 | 0.8337 | 79.61 |
| 29 | Ta2O5 | 0.8420 | 56.13 |
| 30 | SiO2 | 0.8193 | 78.23 |
| 31 | Ta2O5 | 0.8345 | 55.63 |
| 32 | SiO2 | 0.8262 | 78.89 |
| 33 | Ta2O5 | 0.8475 | 56.50 |
| 34 | SiO2 | 0.8296 | 79.22 |
| 35 | Ta2O5 | 0.8385 | 55.90 |
| 36 | SiO2 | 0.8197 | 78.27 |
| 37 | Ta2O5 | 0.8379 | 55.86 |
| 38 | SiO2 | 0.8305 | 79.30 |
| 39 | Ta2O5 | 0.8472 | 56.48 |
| 40 | SiO2 | 0.8259 | 78.86 |
| 41 | Ta2O5 | 0.8363 | 55.75 |
| 42 | SiO2 | 0.8223 | 78.52 |
| 43 | Ta2O5 | 0.8424 | 56.16 |
| 44 | SiO2 | 0.8311 | 79.36 |
| 45 | Ta2O5 | 0.8432 | 56.21 |
| 46 | SiO2 | 0.8242 | 78.70 |
| 47 | Ta2O5 | 0.8375 | 55.83 |
| 48 | SiO2 | 0.8250 | 78.78 |
| 49 | Ta2O5 | 0.8439 | 56.26 |
| 50 | SiO2 | 0.8305 | 79.30 |
| 51 | Ta2O5 | 0.8417 | 56.11 |
| 52 | SiO2 | 0.8223 | 78.52 |
| 53 | Ta2O5 | 0.8391 | 55.94 |
| 54 | SiO2 | 0.8276 | 79.03 |
| 55 | Ta2O5 | 0.8445 | 56.30 |
| 56 | SiO2 | 0.8282 | 79.08 |
| 57 | Ta2O5 | 0.8402 | 56.01 |
| 58 | SiO2 | 0.8237 | 78.65 |
| 59 | Ta2O5 | 0.8405 | 56.03 |
| 60 | SiO2 | 0.8285 | 79.11 |
| 61 | Ta2O5 | 0.8447 | 56.31 |
| 62 | SiO2 | 0.8264 | 78.91 |
| 63 | Ta2O5 | 0.8391 | 55.94 |
| 64 | SiO2 | 0.8242 | 78.70 |
| 65 | Ta2O5 | 0.8433 | 56.22 |
| 66 | SiO2 | 0.8284 | 79.10 |
| 67 | Ta2O5 | 0.8436 | 56.24 |
| 68 | SiO2 | 0.8256 | 78.83 |
| 69 | Ta2O5 | 0.8382 | 55.88 |
| 70 | SiO2 | 0.8260 | 78.87 |
| 71 | Ta2O5 | 0.8445 | 56.30 |
| 72 | SiO2 | 0.8279 | 79.05 |
| 73 | Ta2O5 | 0.8424 | 56.16 |
| 74 | SiO2 | 0.8242 | 78.70 |
| 75 | Ta2O5 | 0.8400 | 56.00 |
| 76 | SiO2 | 0.8276 | 79.03 |
| 77 | Ta2O5 | 0.8445 | 56.30 |

APPENDIX A-continued

| Layer # | Material | Optical Thickness | Metric Thickness (nm) |
|---|---|---|---|
| 78 | SiO2 | 0.8266 | 78.93 |
| 79 | Ta2O5 | 0.8402 | 56.01 |
| 80 | SiO2 | 0.8246 | 78.74 |
| 81 | Ta2O5 | 0.8432 | 56.21 |
| 82 | SiO2 | 0.8275 | 79.02 |
| 83 | Ta2O5 | 0.8429 | 56.19 |
| 84 | SiO2 | 0.8262 | 78.89 |
| 85 | Ta2O5 | 0.8402 | 56.01 |
| 86 | SiO2 | 0.8265 | 78.92 |
| 87 | Ta2O5 | 0.8417 | 56.11 |
| 88 | SiO2 | 0.8282 | 79.08 |
| 89 | Ta2O5 | 0.8435 | 56.23 |
| 90 | SiO2 | 0.8244 | 78.72 |
| 91 | Ta2O5 | 0.8399 | 55.99 |
| 92 | SiO2 | 0.8275 | 79.02 |
| 93 | Ta2O5 | 0.8436 | 56.24 |
| 94 | SiO2 | 0.8275 | 79.02 |
| 95 | Ta2O5 | 0.8403 | 56.02 |
| 96 | SiO2 | 0.8252 | 78.80 |
| 97 | Ta2O5 | 0.8423 | 56.15 |
| 98 | SiO2 | 0.8278 | 79.04 |
| 99 | Ta2O5 | 0.8426 | 56.17 |
| 100 | SiO2 | 0.8260 | 78.87 |
| 101 | Ta2O5 | 0.8405 | 56.03 |
| 102 | SiO2 | 0.8257 | 78.84 |
| 103 | Ta2O5 | 0.8444 | 56.29 |
| 104 | SiO2 | 0.8268 | 78.95 |
| 105 | Ta2O5 | 0.8414 | 56.09 |
| 106 | SiO2 | 0.8256 | 78.83 |
| 107 | Ta2O5 | 0.8412 | 56.08 |
| 108 | SiO2 | 0.8268 | 78.95 |
| 109 | Ta2O5 | 0.8433 | 56.22 |
| 110 | SiO2 | 0.8266 | 78.93 |
| 111 | Ta2O5 | 0.8409 | 56.06 |
| 112 | SiO2 | 0.8259 | 78.86 |
| 113 | Ta2O5 | 0.8424 | 56.16 |
| 114 | SiO2 | 0.8266 | 78.93 |
| 115 | Ta2O5 | 0.8424 | 56.16 |
| 116 | SiO2 | 0.8265 | 78.92 |
| 117 | Ta2O5 | 0.8406 | 56.04 |
| 118 | SiO2 | 0.8260 | 78.87 |
| 119 | Ta2O5 | 0.8426 | 56.17 |
| 120 | SiO2 | 0.8275 | 79.02 |
| 121 | Ta2O5 | 0.8421 | 56.14 |
| 122 | SiO2 | 0.8249 | 78.77 |
| 123 | Ta2O5 | 0.8405 | 56.03 |
| 124 | SiO2 | 0.8270 | 78.97 |
| 125 | Ta2O5 | 0.8424 | 56.16 |
| 126 | SiO2 | 0.8282 | 79.08 |
| 127 | Ta2O5 | 0.8400 | 56.00 |
| 128 | SiO2 | 0.8245 | 78.73 |
| 129 | Ta2O5 | 0.8421 | 56.14 |
| 130 | SiO2 | 0.8273 | 79.00 |
| 131 | Ta2O5 | 0.8432 | 56.21 |
| 132 | SiO2 | 0.8257 | 78.84 |
| 133 | Ta2O5 | 0.8397 | 55.98 |
| 134 | SiO2 | 0.8246 | 78.74 |
| 135 | Ta2O5 | 0.8429 | 56.19 |
| 136 | SiO2 | 0.8288 | 79.14 |
| 137 | Ta2O5 | 0.8412 | 56.08 |
| 138 | SiO2 | 0.8239 | 78.67 |
| 139 | Ta2O5 | 0.8403 | 56.02 |
| 140 | SiO2 | 0.8261 | 78.88 |
| 141 | Ta2O5 | 0.8423 | 56.15 |
| 142 | SiO2 | 0.8283 | 79.09 |
| 143 | Ta2O5 | 0.8409 | 56.06 |
| 144 | SiO2 | 0.8220 | 78.49 |
| 145 | Ta2O5 | 0.8396 | 55.97 |
| 146 | SiO2 | 0.8283 | 79.09 |
| 147 | Ta2O5 | 0.8441 | 56.27 |
| 148 | SiO2 | 0.8262 | 78.89 |
| 149 | Ta2O5 | 0.8379 | 55.86 |
| 150 | SiO2 | 0.8197 | 78.27 |
| 151 | Ta2O5 | 0.8429 | 56.19 |
| 152 | SiO2 | 0.8307 | 79.32 |
| 153 | Ta2O5 | 0.8420 | 56.13 |
| 154 | SiO2 | 0.8217 | 78.46 |

APPENDIX A-continued

| Layer # | Material | Optical Thickness | Metric Thickness (nm) |
|---|---|---|---|
| 155 | Ta2O5 | 0.8357 | 55.71 |
| 156 | SiO2 | 0.8223 | 78.52 |
| 157 | Ta2O5 | 0.8450 | 56.33 |
| 158 | SiO2 | 0.8308 | 79.33 |
| 159 | Ta2O5 | 0.8372 | 55.81 |
| 160 | SiO2 | 0.8161 | 77.93 |
| 161 | Ta2O5 | 0.8354 | 55.69 |
| 162 | SiO2 | 0.8263 | 78.90 |
| 163 | Ta2O5 | 0.8474 | 56.49 |
| 164 | SiO2 | 0.8253 | 78.81 |
| 165 | Ta2O5 | 0.8288 | 55.25 |
| 166 | SiO2 | 0.8103 | 77.37 |
| 167 | Ta2O5 | 0.8391 | 55.94 |
| 168 | SiO2 | 0.8318 | 79.43 |
| 169 | Ta2O5 | 0.8423 | 56.15 |
| 170 | SiO2 | 0.8083 | 77.18 |
| 171 | Ta2O5 | 0.8178 | 54.52 |
| 172 | SiO2 | 0.8087 | 77.22 |
| 173 | Ta2O5 | 0.8436 | 56.24 |
| 174 | SiO2 | 0.8224 | 78.53 |
| 175 | Ta2O5 | 0.8187 | 54.58 |
| 176 | SiO2 | 0.7696 | 73.49 |
| 177 | Ta2O5 | 0.8021 | 53.47 |
| 178 | SiO2 | 0.7686 | 73.39 |
| 179 | Ta2O5 | 0.7329 | 48.86 |
| 180 | SiO2 | 1.5674 | 149.67 |

APPENDIX B

| Layer # | Material | Optical Thickness | Metric Thickness (nm) |
|---|---|---|---|
| 1 | Ta2O5 | 1.5070 | 89.32 |
| 2 | SiO2 | 1.1544 | 98.77 |
| 3 | Ta2O5 | 1.3342 | 79.08 |
| 4 | SiO2 | 1.1510 | 98.48 |
| 5 | Ta2O5 | 1.1930 | 70.71 |
| 6 | SiO2 | 1.1508 | 98.46 |
| 7 | Ta2O5 | 1.2262 | 72.68 |
| 8 | SiO2 | 1.1508 | 98.46 |
| 9 | Ta2O5 | 1.1812 | 70.01 |
| 10 | SiO2 | 1.1501 | 98.40 |
| 11 | Ta2O5 | 1.1692 | 69.30 |
| 12 | SiO2 | 1.1503 | 98.42 |
| 13 | Ta2O5 | 1.1852 | 70.25 |
| 14 | SiO2 | 1.1503 | 98.42 |
| 15 | Ta2O5 | 1.1635 | 68.96 |
| 16 | SiO2 | 1.1500 | 98.39 |
| 17 | Ta2O5 | 1.1530 | 68.34 |
| 18 | SiO2 | 1.1501 | 98.40 |
| 19 | Ta2O5 | 1.1765 | 69.73 |
| 20 | SiO2 | 1.1503 | 98.42 |
| 21 | Ta2O5 | 1.1721 | 69.47 |
| 22 | SiO2 | 1.1500 | 98.39 |
| 23 | Ta2O5 | 1.1534 | 68.36 |
| 24 | SiO2 | 1.1500 | 98.39 |
| 25 | Ta2O5 | 1.1621 | 68.88 |
| 26 | SiO2 | 1.1501 | 98.40 |
| 27 | Ta2O5 | 1.1635 | 68.96 |
| 28 | SiO2 | 1.1500 | 98.39 |
| 29 | Ta2O5 | 1.1483 | 68.06 |
| 30 | SiO2 | 1.1500 | 98.39 |
| 31 | Ta2O5 | 1.1608 | 68.80 |
| 32 | SiO2 | 1.1501 | 98.40 |
| 33 | Ta2O5 | 1.1699 | 69.34 |
| 34 | SiO2 | 1.1501 | 98.40 |
| 35 | Ta2O5 | 1.1555 | 68.49 |
| 36 | SiO2 | 1.1500 | 98.39 |
| 37 | Ta2O5 | 1.1574 | 68.60 |
| 38 | SiO2 | 1.1501 | 98.40 |
| 39 | Ta2O5 | 1.1665 | 69.14 |
| 40 | SiO2 | 1.1501 | 98.40 |
| 41 | Ta2O5 | 1.1544 | 68.42 |
| 42 | SiO2 | 1.1499 | 98.38 |
| 43 | Ta2O5 | 1.1505 | 68.19 |

APPENDIX B-continued

| Layer # | Material | Optical Thickness | Metric Thickness (nm) |
|---|---|---|---|
| 44 | SiO2 | 1.1500 | 98.39 |
| 45 | Ta2O5 | 1.1640 | 68.99 |
| 46 | SiO2 | 1.1501 | 98.40 |
| 47 | Ta2O5 | 1.1591 | 68.70 |
| 48 | SiO2 | 1.1500 | 98.39 |
| 49 | Ta2O5 | 1.1517 | 68.26 |
| 50 | SiO2 | 1.1500 | 98.39 |
| 51 | Ta2O5 | 1.1625 | 68.90 |
| 52 | SiO2 | 1.1501 | 98.40 |
| 53 | Ta2O5 | 1.1608 | 68.80 |
| 54 | SiO2 | 1.1500 | 98.39 |
| 55 | Ta2O5 | 1.1508 | 68.21 |
| 56 | SiO2 | 1.1500 | 98.39 |
| 57 | Ta2O5 | 1.1589 | 68.69 |
| 58 | SiO2 | 1.1501 | 98.40 |
| 59 | Ta2O5 | 1.1628 | 68.92 |
| 60 | SiO2 | 1.1500 | 98.39 |
| 61 | Ta2O5 | 1.1534 | 68.36 |
| 62 | SiO2 | 1.1500 | 98.39 |
| 63 | Ta2O5 | 1.1567 | 68.56 |
| 64 | SiO2 | 1.1500 | 98.39 |
| 65 | Ta2O5 | 1.1623 | 68.89 |
| 66 | SiO2 | 1.1500 | 98.39 |
| 67 | Ta2O5 | 1.1544 | 68.42 |
| 68 | SiO2 | 1.1500 | 98.39 |
| 69 | Ta2O5 | 1.1549 | 68.45 |
| 70 | SiO2 | 1.1500 | 98.39 |
| 71 | Ta2O5 | 1.1620 | 68.87 |
| 72 | SiO2 | 1.1500 | 98.39 |
| 73 | Ta2O5 | 1.1576 | 68.61 |
| 74 | SiO2 | 1.1500 | 98.39 |
| 75 | Ta2O5 | 1.1544 | 68.42 |
| 76 | SiO2 | 1.1500 | 98.39 |
| 77 | Ta2O5 | 1.1596 | 68.73 |
| 78 | SiO2 | 1.1500 | 98.39 |
| 79 | Ta2O5 | 1.1582 | 68.65 |
| 80 | SiO2 | 1.1500 | 98.39 |
| 81 | Ta2O5 | 1.1537 | 68.38 |
| 82 | SiO2 | 1.1500 | 98.39 |
| 83 | Ta2O5 | 1.1576 | 68.61 |
| 84 | SiO2 | 1.1500 | 98.39 |
| 85 | Ta2O5 | 1.1608 | 68.80 |
| 86 | SiO2 | 1.1500 | 98.39 |
| 87 | Ta2O5 | 1.1562 | 68.53 |
| 88 | SiO2 | 1.1500 | 98.39 |
| 89 | Ta2O5 | 1.1561 | 68.52 |
| 90 | SiO2 | 1.1500 | 98.39 |
| 91 | Ta2O5 | 1.1604 | 68.78 |
| 92 | SiO2 | 1.1500 | 98.39 |
| 93 | Ta2O5 | 1.1576 | 68.61 |
| 94 | SiO2 | 1.1500 | 98.39 |
| 95 | Ta2O5 | 1.1537 | 68.38 |
| 96 | SiO2 | 1.1500 | 98.39 |
| 97 | Ta2O5 | 1.1591 | 68.70 |
| 98 | SiO2 | 1.1501 | 98.40 |
| 99 | Ta2O5 | 1.1603 | 68.77 |
| 100 | SiO2 | 1.1500 | 98.39 |
| 101 | Ta2O5 | 1.1532 | 68.35 |
| 102 | SiO2 | 1.1500 | 98.39 |
| 103 | Ta2O5 | 1.1567 | 68.56 |
| 104 | SiO2 | 1.1501 | 98.40 |
| 105 | Ta2O5 | 1.1621 | 68.88 |
| 106 | SiO2 | 1.1500 | 98.39 |
| 107 | Ta2O5 | 1.1552 | 68.47 |
| 108 | SiO2 | 1.1500 | 98.39 |
| 109 | Ta2O5 | 1.1557 | 68.50 |
| 110 | SiO2 | 1.1500 | 98.39 |
| 111 | Ta2O5 | 1.1635 | 68.96 |
| 112 | SiO2 | 1.1501 | 98.40 |
| 113 | Ta2O5 | 1.1569 | 68.57 |
| 114 | SiO2 | 1.1500 | 98.39 |
| 115 | Ta2O5 | 1.1518 | 68.27 |
| 116 | SiO2 | 1.1500 | 98.39 |
| 117 | Ta2O5 | 1.1603 | 68.77 |
| 118 | SiO2 | 1.1501 | 98.40 |
| 119 | Ta2O5 | 1.1593 | 68.71 |
| 120 | SiO2 | 1.1500 | 98.39 |
| 121 | Ta2O5 | 1.1530 | 68.34 |
| 122 | SiO2 | 1.1500 | 98.39 |
| 123 | Ta2O5 | 1.1608 | 68.80 |
| 124 | SiO2 | 1.1501 | 98.40 |
| 125 | Ta2O5 | 1.1640 | 68.99 |
| 126 | SiO2 | 1.1500 | 98.39 |
| 127 | Ta2O5 | 1.1539 | 68.39 |
| 128 | SiO2 | 1.1500 | 98.39 |
| 129 | Ta2O5 | 1.1569 | 68.57 |
| 130 | SiO2 | 1.1501 | 98.40 |
| 131 | Ta2O5 | 1.1642 | 69.00 |
| 132 | SiO2 | 1.1501 | 98.40 |
| 133 | Ta2O5 | 1.1562 | 68.53 |
| 134 | SiO2 | 1.1500 | 98.39 |
| 135 | Ta2O5 | 1.1554 | 68.48 |
| 136 | SiO2 | 1.1500 | 98.39 |
| 137 | Ta2O5 | 1.1643 | 69.01 |
| 138 | SiO2 | 1.1501 | 98.40 |
| 139 | Ta2O5 | 1.1579 | 68.63 |
| 140 | SiO2 | 1.1500 | 98.39 |
| 141 | Ta2O5 | 1.1513 | 68.24 |
| 142 | SiO2 | 1.1500 | 98.39 |
| 143 | Ta2O5 | 1.1626 | 68.91 |
| 144 | SiO2 | 1.1501 | 98.40 |
| 145 | Ta2O5 | 1.1665 | 69.14 |
| 146 | SiO2 | 1.1501 | 98.40 |
| 147 | Ta2O5 | 1.1576 | 68.61 |
| 148 | SiO2 | 1.1500 | 98.39 |
| 149 | Ta2O5 | 1.1643 | 69.01 |
| 150 | SiO2 | 1.1501 | 98.40 |
| 151 | Ta2O5 | 1.1687 | 69.27 |
| 152 | SiO2 | 1.1501 | 98.40 |
| 153 | Ta2O5 | 1.1520 | 68.28 |
| 154 | SiO2 | 1.1499 | 98.38 |
| 155 | Ta2O5 | 1.1569 | 68.57 |
| 156 | SiO2 | 1.1501 | 98.40 |
| 157 | Ta2O5 | 1.1758 | 69.69 |
| 158 | SiO2 | 1.1502 | 98.41 |
| 159 | Ta2O5 | 1.1685 | 69.26 |
| 160 | SiO2 | 1.1501 | 98.40 |
| 161 | Ta2O5 | 1.1655 | 69.08 |
| 162 | SiO2 | 1.1502 | 98.41 |
| 163 | Ta2O5 | 1.1812 | 70.01 |
| 164 | SiO2 | 1.1503 | 98.42 |
| 165 | Ta2O5 | 1.1739 | 69.58 |
| 166 | SiO2 | 1.1501 | 98.40 |
| 167 | Ta2O5 | 1.1716 | 69.44 |
| 168 | SiO2 | 1.1505 | 98.43 |
| 169 | Ta2O5 | 1.2062 | 71.49 |
| 170 | SiO2 | 1.1507 | 98.45 |
| 171 | Ta2O5 | 1.2025 | 71.27 |
| 172 | SiO2 | 1.1506 | 98.44 |
| 173 | Ta2O5 | 1.2021 | 71.25 |
| 174 | SiO2 | 1.1512 | 98.49 |
| 175 | Ta2O5 | 1.2828 | 76.03 |
| 176 | SiO2 | 1.1521 | 98.57 |
| 177 | Ta2O5 | 1.3081 | 77.53 |
| 178 | SiO2 | 1.1524 | 98.60 |
| 179 | Ta2O5 | 1.3750 | 81.50 |
| 180 | SiO2 | 0.5780 | 49.45 |

APPENDIX C 532 nm laser line filter example:
Total number of layers: 117
Total metric thickness: 10.547 μm
Reference wavelength: 532 nm

| Layer # | Material | Optical Thickness | Metric Thickness (nm) |
|---|---|---|---|
| 1 | Nb2O5 | 1.0000 | 56.97 |
| 2 | SIO2 | 1.0000 | 89.33 |
| 3 | Nb2O5 | 1.0000 | 56.97 |

APPENDIX C-continued 532 nm laser line filter example:
Total number of layers: 117
Total metric thickness: 10.547 μm
Reference wavelength: 532 nm

| Layer # | Material | Optical Thickness | Metric Thickness (nm) |
|---|---|---|---|
| 4 | SIO2 | 1.0000 | 89.33 |
| 5 | Nb2O5 | 1.0000 | 56.97 |
| 6 | SIO2 | 1.0000 | 89.33 |
| 7 | Nb2O5 | 6.0000 | 341.81 |
| 8 | SIO2 | 1.0000 | 89.33 |
| 9 | Nb2O5 | 1.0000 | 56.97 |
| 10 | SIO2 | 1.0000 | 89.33 |
| 11 | Nb2O5 | 1.0000 | 56.97 |
| 12 | SIO2 | 1.0000 | 89.33 |
| 13 | Nb2O5 | 1.0000 | 56.97 |
| 14 | SIO2 | 1.0000 | 89.33 |
| 15 | Nb2O5 | 1.0000 | 56.97 |
| 16 | SIO2 | 1.0000 | 89.33 |
| 17 | Nb2O5 | 1.0000 | 56.97 |
| 18 | SIO2 | 1.0000 | 89.33 |
| 19 | Nb2O5 | 1.0000 | 56.97 |
| 20 | SIO2 | 1.0000 | 89.33 |
| 21 | Nb2O5 | 1.0000 | 56.97 |
| 22 | SIO2 | 1.0000 | 89.33 |
| 23 | Nb2O5 | 6.0000 | 341.81 |
| 24 | SIO2 | 1.0000 | 89.33 |
| 25 | Nb2OS | 1.0000 | 56.97 |
| 26 | SIO2 | 1.0000 | 89.33 |
| 27 | Nb2O5 | 1.0000 | 56.97 |
| 28 | SIO2 | 1.0000 | 89.33 |
| 29 | Nb2O5 | 1.0000 | 56.97 |
| 30 | SIO2 | 1.0000 | 89.33 |
| 31 | Nb2O5 | 1.0000 | 56.97 |
| 32 | SIO2 | 1.0000 | 89.33 |
| 33 | Nb2OS | 1.0000 | 56.97 |
| 34 | SIO2 | 1.0000 | 89.33 |
| 35 | Nb2O5 | 1.0000 | 56.97 |
| 36 | SIO2 | 1.0000 | 89.33 |
| 37 | Nb2O5 | 1.0000 | 56.97 |
| 38 | SIO2 | 1.0000 | 89.33 |
| 39 | Nb2O5 | 1.0000 | 56.97 |
| 40 | SIO2 | 1.0000 | 89.33 |
| 41 | Nb2O5 | 6.0000 | 341.81 |
| 42 | SIO2 | 1.0000 | 89.33 |
| 43 | Nb2O5 | 1.0000 | 56.97 |
| 44 | SIO2 | 1.0000 | 89.33 |
| 45 | Nb2O5 | 1.0000 | 56.97 |
| 46 | SIO2 | 1.0000 | 89.33 |
| 47 | Nb2O5 | 1.0000 | 56.97 |
| 48 | SIO2 | 1.0000 | 89.33 |
| 49 | Nb2O5 | 1.0000 | 56.97 |
| 50 | SIO2 | 1.0000 | 89.33 |
| 51 | Nb2O5 | 1.0000 | 56.97 |
| 52 | SIO2 | 1.0000 | 89.33 |
| 53 | Nb2O5 | 1.0000 | 56.97 |
| 54 | SIO2 | 1.0000 | 89.33 |
| 55 | Nb2O5 | 1.0000 | 56.97 |
| 56 | SIO2 | 1.0000 | 89.33 |
| 57 | Nb2O5 | 6.0000 | 341.81 |
| 58 | SIO2 | 1.0000 | 89.33 |
| 59 | Nb2O5 | 1.0000 | 56.97 |
| 60 | SIO2 | 1.0000 | 89.33 |
| 61 | Nb2O5 | 1.0000 | 56.97 |
| 62 | SIO2 | 1.0000 | 89.33 |
| 63 | Nb2O5 | 1.4657 | 83.5 |
| 64 | SIO2 | 1.3533 | 120.89 |
| 65 | Nb2O5 | 1.4705 | 83.77 |
| 66 | SIO2 | 1.3765 | 122.96 |
| 67 | Nb2O5 | 0.9999 | 56.96 |
| 68 | SIO2 | 1.1833 | 105.7 |
| 69 | Nb2O5 | 1.6155 | 92.03 |
| 70 | SIO2 | 1.2521 | 111.85 |
| 71 | Nb2O5 | 1.0006 | 57 |
| 72 | SIO2 | 1.2641 | 112.92 |
| 73 | Nb2O5 | 1.4071 | 80.16 |
| 74 | SIO2 | 1.1235 | 100.36 |
| 75 | Nb2O5 | 1.5275 | 87.02 |
| 76 | SIO2 | 1.3817 | 123.42 |
| 77 | Nb2O5 | 0.9646 | 54.95 |
| 78 | SIO2 | 0.9697 | 86.62 |
| 79 | Nb2O5 | 0.9442 | 53.79 |
| 80 | SIO2 | 1.8099 | 161.67 |
| 81 | Nb2O5 | 1.3664 | 77.84 |
| 82 | SIO2 | 1.0646 | 95.1 |
| 83 | Nb2O5 | 1.0062 | 57.32 |
| 84 | SIO2 | 1.0493 | 93.73 |
| 85 | Nb2O5 | 1.9448 | 110.79 |
| 86 | SIO2 | 0.9812 | 87.65 |
| 87 | Nb2O5 | 0.9949 | 56.68 |
| 88 | SIO2 | 0.9929 | 88.69 |
| 89 | Nb2O5 | 2.1807 | 124.23 |
| 90 | SIO2 | 0.9920 | 88.61 |
| 91 | Nb2O5 | 0.9242 | 52.65 |
| 92 | SIO2 | 0.9667 | 86.35 |
| 93 | Nb2O5 | 1.8881 | 107.56 |
| 94 | SIO2 | 1.0066 | 89.92 |
| 95 | Nb2O5 | 0.9844 | 56.08 |
| 96 | SIO2 | 1.0126 | 90.45 |
| 97 | Nb2O5 | 0.9741 | 55.49 |
| 98 | SIO2 | 1.9004 | 169.76 |
| 99 | Nb2O5 | 1.0350 | 58.96 |
| 100 | SIO2 | 1.0158 | 90.74 |
| 101 | Nb2O5 | 0.9052 | 51.57 |
| 102 | SIO2 | 0.9634 | 86.06 |
| 103 | Nb2O5 | 2.2488 | 128.11 |
| 104 | SIO2 | 1.0016 | 89.47 |
| 105 | Nb2O5 | 0.8728 | 49.72 |
| 106 | SIO2 | 1.0012 | 89.43 |
| 107 | Nb2O5 | 0.8429 | 48.02 |
| 108 | SIO2 | 2.2807 | 203.73 |
| 109 | Nb2O5 | 1.0253 | 58.41 |
| 110 | SIO2 | 0.8448 | 75.46 |
| 111 | Nb2OS | 0.9323 | 53.11 |
| 112 | SIO2 | 0.7971 | 71.2 |
| 113 | Nb2O5 | 0.7301 | 41.59 |
| 114 | SIO2 | 0.9671 | 86.39 |
| 115 | Nb2O5 | 1.0348 | 58.95 |
| 116 | SIO2 | 2.1758 | 194.36 |
| 117 | Nb2O5 | 0.9267 | 52.79 |

APPENDIX D 785 nm laser line filter example:

| Layer # | Material | Optical Thickness | Metric Thickness (nm) |
|---|---|---|---|
| Side 1 Coating (Multi-cavity Fabry-Perot Coating): | | | |
| Total number of layers: 64 | | | |
| Total metric thickness: 10.071 μm | | | |
| Reference wavelength: 785 nm | | | |
| 1 | Nb2O5 | 1.0000 | 87.13 |
| 2 | SIO2 | 1.0000 | 132.52 |
| 3 | Nb2O5 | 1.0000 | 87.13 |
| 4 | SIO2 | 1.0000 | 132.52 |
| 5 | Nb2O5 | 1.0000 | 87.13 |
| 6 | SIO2 | 1.0000 | 132.52 |
| 7 | Nb2O5 | 10.0000 | 871.35 |
| 8 | SIO2 | 1.0000 | 132.52 |
| 9 | Nb2O5 | 1.0000 | 87.13 |
| 10 | SIO2 | 1.0000 | 132.52 |
| 11 | Nb2O5 | 1.0000 | 87.13 |
| 12 | SIO2 | 1.0000 | 132.52 |

APPENDIX D-continued 785 nm laser line filter example:

| Layer # | Material | Optical Thickness | Metric Thickness (nm) |
|---|---|---|---|
| 13 | Nb2O5 | 1.0000 | 87.13 |
| 14 | SIO2 | 1.0000 | 132.52 |
| 15 | Nb2O5 | 1.0000 | 87.13 |
| 16 | SIO2 | 1.0000 | 132.52 |
| 17 | Nb2O5 | 1.0000 | 87.13 |
| 18 | SIO2 | 1.0000 | 132.52 |
| 19 | Nb2O5 | 1.0000 | 87.13 |
| 20 | SIO2 | 1.0000 | 132.52 |
| 21 | Nb2O5 | 1.0000 | 87.13 |
| 22 | SIO2 | 1.0000 | 132.52 |
| 23 | Nb2O5 | 10.0000 | 871.35 |
| 24 | SIO2 | 1.0000 | 132.52 |
| 25 | Nb2O5 | 1.0000 | 87.13 |
| 26 | SIO2 | 1.0000 | 132.52 |
| 27 | Nb2O5 | 1.0000 | 87.13 |
| 28 | SIO2 | 1.0000 | 132.52 |
| 29 | Nb2O5 | 1.0000 | 87.13 |
| 30 | SIO2 | 1.0000 | 132.52 |
| 31 | Nb2O5 | 1.0000 | 87.13 |
| 32 | SIO2 | 1.0000 | 132.52 |
| 33 | Nb2O5 | 1.0000 | 87.13 |
| 34 | SIO2 | 1.0000 | 132.52 |
| 35 | Nb2O5 | 1.0000 | 87.13 |
| 36 | SIO2 | 1.0000 | 132.52 |
| 37 | Nb2O5 | 1.0000 | 87.13 |
| 38 | SIO2 | 1.0000 | 132.52 |
| 39 | Nb2O5 | 1.0000 | 87.13 |
| 40 | SIO2 | 1.0000 | 132.52 |
| 41 | Nb2O5 | 10.0000 | 871.35 |
| 42 | SIO2 | 1.0000 | 132.52 |
| 43 | Nb2O5 | 1.0000 | 87.13 |
| 44 | SIO2 | 1.0000 | 132.52 |
| 45 | Nb2O5 | 1.0000 | 87.13 |
| 46 | SIO2 | 1.0000 | 132.52 |
| 47 | Nb2O5 | 1.0000 | 87.13 |
| 48 | SIO2 | 1.0000 | 132.52 |
| 49 | Nb2O5 | 1.0000 | 87.13 |
| 50 | SIO2 | 1.0000 | 132.52 |
| 51 | Nb2O5 | 1.0000 | 87.13 |
| 52 | SIO2 | 1.0000 | 132.52 |
| 53 | Nb2O5 | 1.0000 | 87.13 |
| 54 | SIO2 | 1.0000 | 132.52 |
| 55 | Nb2O5 | 1.0000 | 87.13 |
| 56 | SIO2 | 1.0000 | 132.52 |
| 57 | Nb2O5 | 10.0000 | 871.35 |
| 58 | SIO2 | 1.0000 | 132.52 |
| 59 | Nb205 | 1.0000 | 87.13 |
| 60 | SIO2 | 1.0000 | 132.52 |
| 61 | Nb2O5 | 1.0000 | 87.13 |
| 62 | SIO2 | 1.0000 | 132.52 |
| 63 | Nb2O5 | 0.8205 | 71.49 |
| 64 | SIO2 | 0.4006 | 53.09 |

Side 2 Coating (Extended Blocking Coating):
Total number of layers: 97
Total metric thickness: 12.552 μm
Reference wavelength: 785 nm

| Layer # | Material | Optical Thickness | Metric Thickness (nm) |
|---|---|---|---|
| 1 | Nb2O5 | 1.5450 | 134.62 |
| 2 | SIO2 | 1.6001 | 212.05 |
| 3 | Nb205 | 1.6251 | 141.6 |
| 4 | SIO2 | 1.5542 | 205.97 |
| 5 | Nb2O5 | 1.6993 | 148.07 |
| 6 | SIO2 | 1.2947 | 171.57 |
| 7 | Nb2O5 | 1.3634 | 118.8 |
| 8 | SIO2 | 1.4863 | 196.96 |
| 9 | Nb2O5 | 1.8081 | 157.55 |
| 10 | SIO2 | 1.2972 | 171.91 |
| 11 | Nb2O5 | 1.5553 | 135.52 |
| 12 | SIO2 | 1.3329 | 176.63 |
| 13 | Nb2O5 | 1.5197 | 132.42 |
| 14 | SIO2 | 1.3483 | 178.68 |
| 15 | Nb2O5 | 1.7784 | 154.96 |
| 16 | SIO2 | 1.5029 | 199.16 |
| 17 | Nb2O5 | 1.5359 | 133.83 |
| 18 | SIO2 | 1.3245 | 175.53 |
| 19 | Nb2O5 | 1.4620 | 127.39 |
| 20 | SIO2 | 1.2907 | 171.05 |
| 21 | Nb2O5 | 1.5373 | 133.95 |
| 22 | SIO2 | 1.4740 | 195.33 |
| 23 | Nb2O5 | 1.2955 | 112.88 |
| 24 | SIO2 | 1.7358 | 230.03 |
| 25 | Nb2O5 | 1.5132 | 131.85 |
| 26 | SIO2 | 1.3733 | 181.99 |
| 27 | Nb2O5 | 1.1962 | 104.23 |
| 28 | SIO2 | 1.6960 | 224.76 |
| 29 | Nb2O5 | 1.4493 | 126.28 |
| 30 | SIO2 | 1.5669 | 207.65 |
| 31 | Nb2O5 | 1.4386 | 125.35 |
| 32 | SIO2 | 1.3825 | 183.21 |
| 33 | Nb2O5 | 1.2904 | 112.44 |
| 34 | SIO2 | 1.3064 | 173.13 |
| 35 | Nb2O5 | 1.5143 | 131.95 |
| 36 | SIO2 | 1.2225 | 162.01 |
| 37 | Nb2O5 | 1.1840 | 103.17 |
| 38 | SIO2 | 1.2868 | 170.53 |
| 39 | Nb2O5 | 1.3245 | 115.41 |
| 40 | SIO2 | 1.2352 | 163.69 |
| 41 | Nb2O5 | 1.3348 | 116.31 |
| 42 | SIO2 | 1.1382 | 150.84 |
| 43 | Nb2OS | 1.0250 | 89.31 |
| 44 | SIO2 | 1.0648 | 141.11 |
| 45 | Nb2OS | 1.3646 | 118.9 |
| 46 | SIO2 | 1.2818 | 169.86 |
| 47 | Nb2O5 | 1.1937 | 104.01 |
| 48 | SIO2 | 1.2427 | 164.68 |
| 49 | Nb2OS | 1.2020 | 104.74 |
| 50 | SIO2 | 1.1265 | 149.28 |
| 51 | Nb2O5 | 1.1635 | 101.38 |
| 52 | SIO2 | 1.6197 | 214.65 |
| 53 | Nb2O5 | 1.0289 | 89.65 |
| 54 | SIO2 | 0.9763 | 129.38 |
| 55 | Nb2O5 | 1.0555 | 91.97 |
| 56 | SIO2 | 1.2538 | 166.15 |
| 57 | Nb2O5 | 1.2109 | 105.51 |
| 58 | SIO2 | 1.1705 | 155.11 |
| 59 | Nb2O5 | 1.5944 | 138.93 |
| 60 | SIO2 | 1.1068 | 146.68 |
| 61 | Nb2O5 | 0.9993 | 87.07 |
| 62 | SIO2 | 0.9594 | 127.14 |
| 63 | Nb2O5 | 0.8971 | 78.17 |
| 64 | SIO2 | 2.0755 | 275.04 |
| 65 | Nb2O5 | 0.9110 | 79.38 |
| 66 | SIO2 | 0.9686 | 128.36 |
| 67 | Nb2O5 | 0.9806 | 85.44 |
| 68 | SIO2 | 1.0124 | 134.16 |
| 69 | Nb2O5 | 0.4275 | 37.25 |
| 70 | SIO2 | 0.5282 | 70 |
| 71 | Nb2O5 | 0.9570 | 83.39 |
| 72 | SIO2 | 0.9958 | 131.96 |
| 73 | Nb2O5 | 0.9570 | 83.39 |
| 74 | SIO2 | 0.9463 | 125.41 |
| 75 | Nb2O5 | 0.8560 | 74.59 |
| 76 | SIO2 | 0.6548 | 86.78 |
| 77 | Nb2O5 | 0.5898 | 51.39 |
| 78 | SIO2 | 0.8415 | 111.52 |
| 79 | Nb2O5 | 0.9193 | 80.1 |
| 80 | SIO2 | 0.9385 | 124.37 |
| 81 | Nb2O5 | 0.8907 | 77.61 |
| 82 | SIO2 | 0.7786 | 103.18 |
| 83 | Nb2OS | 0.6800 | 59.25 |
| 84 | SIO2 | 0.8230 | 109.07 |
| 85 | Nb2OS | 0.8759 | 76.32 |
| 86 | SIO2 | 0.8193 | 108.57 |
| 87 | Nb2O5 | 0.7508 | 65.42 |
| 88 | SIO2 | 0.8402 | 111.35 |
| 89 | Nb2O5 | 0.9150 | 79.73 |
| 90 | SIO2 | 0.9614 | 127.41 |
| 91 | Nb2O5 | 0.9344 | 81.42 |

APPENDIX D-continued 785 nm laser line filter example:

| Layer # | Material | Optical Thickness | Metric Thickness (nm) |
|---|---|---|---|
| 92 | SIO2 | 0.8463 | 112.15 |
| 93 | Nb2O5 | 0.6231 | 54.29 |
| 94 | SIO2 | 0.6885 | 91.24 |
| 95 | Nb2O5 | 0.8505 | 74.11 |
| 96 | SIO2 | 0.8395 | 111.25 |
| 97 | Nb2O5 | 0.8249 | 71.88 |

What is claimed is:

1. A method of manufacturing an optical filter, the filter comprising a substrate, a multi-cavity Fabry-Perot layer, and an extended blocking layer, wherein for the multi-cavity Fabry-Perot layer, the method comprises the steps of:
   calculating, with a data processor, a first theoretical transmission $T_i$ of light through the multi-cavity Fabry-Perot layer;
   calculating, with the data processor, a first expected deposition time $t_i$ of the multi-cavity Fabry-Perot layer;
   measuring, during deposition of the multi-cavity Fabry-Perot layer for a period less than the first $t_i$, a first measured transmission $T_m$ of light through the multi-cavity Fabry-Perot layer;
   determining, with the data processor, when deposition of the multi-cavity Fabry-Perot layer is to terminate based upon the first theoretical transmission $T_i$ and the first measured transmission $T_m$;
   wherein for the extended blocking layer, the method further comprises the steps of:
   calculating, with the data processor, a second expected deposition time $t_i$ of the extended blocking layer; and
   determining, with the data processor, when deposition of the extended blocking layer is to terminate based upon the second expected deposition time $t_i$.

2. The method of claim 1, wherein, for the multi-cavity Fabry-Perot layer, the step of calculating the first $T_i$ calculates the first $T_i$ based upon a desired thickness d of the multi-cavity Fabry-Perot layer at a series of wavelengths, thereby generating a series of curves $T_i$ vs. d at each of the series of wavelengths,
   the step of measuring the first $T_m$ measures the first $T_m$ as a function of actual time transpired t, thereby generating a curve $T_m$ vs. t, and
   the method further comprises the step of:
   determining an optical monitoring wavelength $\lambda_m$ based upon the series of curves $T_i$ vs. d, thereby selecting a single curve $T_i$ vs. d at $\lambda_m$ from the series of curves,
   wherein the step of determining when deposition of the multi-cavity Fabry-Perot layer is to terminate comprises the steps of:
   generating a plurality of transmission data curves $T_{ijk}$ as a function of multiple time values based upon the single curve $T_i$ vs. d at $\lambda_m$;
   calculating error between each $T_{ijk}$ curve and the curve $T_m$ vs. t;
   selecting one of the plurality of Tik curves having a minimum calculated error, the selected $T_{ijk}$ curve being associated with one of the multiple time values; and
   determining when deposition of the multi-cavity Fabry-Perot layer is to terminate based upon the one of the multiple time values.

3. The method of claim 2, wherein, for the multi-cavity Fabry-Perot layer, the step of generating the plurality of transmission data curves $T_{ijk}$ generates the curves $T_{ijk}$ by plotting values of $T_i$ against a two-dimensional array of time vectors.

4. The method of claim 2 wherein, for the multi-cavity Fabry-Perot layer, the plurality of transmission data curves $T_{ijk}$ are scaled prior to calculating error between each $T_{ijk}$ curve and the curve $T_m$ vs. t.

5. The method of claim 4, wherein, for the multi-cavity Fabry-Perot layer,
   a mid-point between two extrema for each curve $T_{ijk}$ is scaled by a factor so that it equals a mid-point between two extrema of the curve $T_m$ vs. t, and
   maximum and minimum values on each curve $T_{ijk}$ are scaled by scaling uniformly about a mean of the $T_{ijk}$ curve being scaled so that a difference between the maximum and minimum values for each curve $T_{ijk}$ is equal to that of the curve $T_m$ vs. t.

6. A laser-line filter comprising a transparent substrate having a first surface, wherein one or more multi-cavity Fabry-Perot layers and one or more extended blocking layers are disposed overlying the first surface, and wherein at least one of the multi-cavity Fabry-Perot layers and at least one of the extended blocking layers are formed by the method of claim 2.

7. An optical analysis system for exciting a sample of material with light of a first wavelength to produce a measurable or viewable optical response at a second wavelength different from the first, the system comprising a source of excitation light, an optical path coupling the excitation light to the sample, a filter in the path between the source and the sample for blocking light at some wavelengths different from the excitation light, and an optical path coupling light from the sample to an analyzer or viewer,
   wherein the filter is a laser-line filter comprising a multi-cavity Fabry-Perot layer and an extended blocking layer made by the method of claim 2.

8. The method of claim 1, wherein the optical filter is a laser-line filter.

9. A laser-line filter comprising a transparent substrate having a first surface, wherein one or more multi-cavity Fabry-Perot layers and one or more extended blocking layers are disposed overlying the first surface, and wherein at least one of the multi-cavity Fabry-Perot layers and at least one of the extended blocking layers are formed by the method of claim 1.

10. The laser-line filter of claim 9 wherein the substrate has a second surface, and the optical filter further comprises one or more anti-reflection layers disposed overlying the second surface.

11. An optical analysis system for exciting a sample of material with light of a first wavelength to produce a measurable or viewable optical response at a second wavelength different from the first, the system comprising a source of excitation light, an optical path coupling the excitation light to the sample, a filter in the path between the source and the sample for blocking light at some wavelengths different from the excitation light, and an optical path coupling light from the sample to an analyzer or viewer,
   wherein the filter is a laser-line filter comprising a multi-cavity Fabry-Perot layer and an extended blocking layer made by the method of claim 1.

12. A method of manufacturing an optical filter, the filter comprising a substrate, a multi-cavity Fabry-Perot layer, and an extended blocking layer, wherein for the multi-cavity Fabry-Perot layer, the method comprises the steps of:

calculating, with a data processor, a first theoretical transmission $T_i$ of light through the multi-cavity Fabry-Perot layer;

calculating, with the data processor, a first expected deposition time $t_i$ of the multi-cavity Fabry-Perot layer;

measuring, during deposition of the multi-cavity Fabry-Perot layer for a period less than the first $t_i$, a first measured transmission $T_m$ of light through the multi-cavity Fabry-Perot layer;

determining, with the data processor, when deposition of the multi-cavity Fabry-Perot layer is to terminate based upon the first theoretical transmission $T_i$ and the first measured transmission $T_m$, wherein for the extended blocking layer, the method further comprises the steps of:

calculating, with the data processor, a second theoretical transmission $T_i$ of light through the extended blocking layer;

calculating, with the data processor, a second expected deposition time $t_i$ of the extended blocking layer;

measuring, during deposition of the extended blocking layer for a period less than the second $t_i$, a second measured transmission $T_m$ of light through the extended blocking layer; and determining, with the data processor, when deposition of the extended blocking layer is to terminate based upon the second theoretical transmission $T_i$ and the second measured transmission $T_m$.

13. The method of claim 12, wherein
the first $t_i$ is calculated based upon a first desired thickness of the multi-cavity Fabry-Perot layer d and a first known deposition rate r for the multi-cavity Fabry-Perot layer, and the second $t_i$ is calculated based upon a second desired thickness of the extended blocking layer d and a second known deposition rate r for the extended blocking layer.

14. A laser-line filter comprising (1) a transparent substrate having a first surface and a second surface, (2) one or more multi-cavity Fabry-Perot layers disposed overlying the first surface, and (3) one or more extended blocking layers disposed overlying the second surface, wherein at least one of the multi-cavity Fabry-Perot layers and at least one of the extended blocking layers are formed by the method of claim 8.

15. The method of claim 12, wherein, for the multi-cavity Fabry-Perot layer, the step of calculating the first $T_i$ calculates the first $T_i$ based upon a desired thickness d of the multi-cavity Fabry-Perot layer at a series of wavelengths, thereby generating a series of curves $T_i$ vs. d at each of the series of wavelengths, the step of measuring the first $T_m$ measures the first $T_m$ as a function of actual time transpired t, thereby generating a curve $T_m$ vs. t, and the method further comprises the steps of:

determining an optical monitoring wavelength $\lambda_m$ based upon the series of curves $T_i$ vs. d, thereby selecting a single curve $T_i$ vs. d at $\lambda_m$ from the series of curves, wherein the step of determining when deposition of the multi-cavity Fabry-Perot layer is to terminate comprises the steps of:

generating a plurality of transmission data curves $T_{ijk}$ as a function of multiple time values based upon the single curve $T_i$ vs. d at $\lambda_m$;

calculating error between each $T_{ijk}$ curve and the curve $T_m$ vs. t;

selecting one of the plurality of $T_{ijk}$ curves having a minimum calculated error, the selected $T_{ijk}$ curve being associated with one of the multiple time values; and determining when deposition of the multi-cavity Fabry-Perot layer is to terminate based upon the one of the multiple time values.

16. The method of claim 15, wherein, for the multi-cavity Fabry-Perot layer, the step of generating the plurality of transmission data curves $T_{ijk}$ generates the curves $T_{ijk}$ by plotting values of $T_i$ against a two-dimensional array of time vectors.

17. The method of claim 15 wherein, for the multi-cavity Fabry-Perot layer, the plurality of transmission data curves $T_{ijk}$ are scaled prior to calculating error between each $T_{ijk}$ curve and the curve $T_m$ vs. t.

18. The method of claim 17, wherein, for the multi-cavity Fabry-Perot layer, a mid-point between two extrema for each curve $T_{ijk}$ is scaled by a factor so that it equals a mid-point between two extrema of the curve $T_m$ vs. t, and maximum and minimum values on each curve $T_{ijk}$ are scaled by scaling uniformly about a mean of the $T_{ijk}$ curve being scaled so that a difference between the maximum and minimum values for each curve $T_{ijk}$ is equal to that of the curve $T_m$ vs. t.

19. A laser-line filter comprising (1) a transparent substrate having a first surface and a second surface, (2) one or more multi-cavity Fabry-Perot layers disposed overlying the first surface, and (3) one or more extended blocking layers disposed overlying the second surface, wherein at least one of the multi-cavity Fabry-Perot layers and at least one of the extended blocking layers are formed by the method of claim 15.

20. An optical analysis system for exciting a sample of material with light of a first wavelength to produce a measurable or viewable optical response at a second wavelength different from the first, the system comprising a source of excitation light, an optical path coupling the excitation light to the sample, a filter in the path between the source and the sample for blocking light at some wavelengths different from the excitation light, and an optical path coupling light from the sample to an analyzer or viewer, wherein the filter is a laser-line filter comprising a multi-cavity Fabry-Perot layer and an extended blocking layer made by the method of claim 15.

21. The method of claim 12, wherein, for the extended blocking layer, the step of calculating $T_i$ calculates $T_i$ based upon a desired thickness d of the extended blocking layer at a series of wavelengths, thereby generating a series of curves $T_i$ vs. d at each of the series of wavelengths, the step of measuring the second $T_m$ measures the second $T_m$ as a function of actual time transpired t, thereby generating a curve $T_m$ vs. t, and the method further comprises the steps of:

determining an optical monitoring wavelength $\lambda_m$ based upon the series of curves $T_i$ vs. d, thereby selecting a single curve $T_i$ vs. d at $\lambda_m$ from the series of curves; and converting the single curve $T_i$ vs. d at $\lambda_m$ to $T_i$ vs. t using the equation t=d/r, where r is a known deposition rate for the extended blocking layer, wherein the step of determining when deposition of the extended blocking layer is to terminate comprises the steps of:

calculating a deposition rate $r_{ci}$ by minimizing an error between the curve $T_i$ vs. t and the curve $T_m$ vs. t, the minimizing occurring by varying parameters pertaining to the curve $T_i$ vs. t; and determining when deposition of the extended blocking layer is to terminate based upon the calculated deposition rate $r_{ci}$ or a deposition rate derived therefrom.

22. The method of claim 21, wherein, for the extended blocking layer, the extended blocking layer is a current layer, the parameters are $\beta_1, \beta_2, \beta_3$, and the deposition rate r, and $\beta_1, \beta_2$, and $\beta_3$, are defined as:

$$\beta_1 = \frac{n_a^2 + n_{m+1}^2}{2}\left(|p|^2 + \frac{|q|^2}{n_{m+1}^2}\right) + 2n_a \mathrm{Re}(pq^*),$$

$$\beta_2 = \frac{n_a^2 - n_{m+1}^2}{2}\left(|p|^2 - \frac{|q|^2}{n_{m+1}^2}\right), \text{ and}$$

$$\beta_3 = \left(\frac{n_a^2}{n_{m+1}} - n_{m+1}\right)\mathrm{Im}(p^*q),$$

wherein $n_a$ is a refractive index of an incident medium, $n_{m+1}$ is a refractive index of the layer, and p and q are defined as:

$$\begin{bmatrix} p \\ q \end{bmatrix} = \prod_{l=1}^{m} \begin{bmatrix} \cos\theta_l & -i\sin\theta_l/n_l \\ -in_l\sin\theta_l & \cos\theta_l \end{bmatrix} \begin{bmatrix} 1 \\ n_s \end{bmatrix}$$

wherein $\theta_1$ is accumulated phase in an $l_{th}$ layer of the optical filter, m represents a number of layers that have been deposited, $n_l$ is a refractive index of the $l_{th}$ layer, $n_s$ is a refractive index of a substrate, and $i=\sqrt{-1}$ in the definition of p and q.

23. The method of claim 21, wherein, for the extended blocking layer, the method further comprises the step of:

calculating a best deposition rate $r_{bi}$ by calculating a rolling average of other $r_{ci}$ deposition rates, wherein the step of determining when deposition of the extended blocking layer is to terminate determines when deposition of the extended blocking layer is to terminate based upon the best deposition rate $r_{bi}$.

24. A laser-line filter comprising (1) a transparent substrate having a first surface and a second surface, (2) one or more multi-cavity Fabry-Perot layers disposed overlying the first surface, and (3) one or more extended blocking layers disposed overlying the second surface, wherein at least one of the multi-cavity Fabry-Perot layers and at least one of the extended blocking layers are formed by the method of claim 21.

25. An optical analysis system for exciting a sample of material with light of a first wavelength to produce a measurable or viewable optical response at a second wavelength different from the first, the system comprising a source of excitation light, an optical path coupling the excitation light to the sample, a filter in the path between the source and the sample for blocking light at some wavelengths different from the excitation light, and an optical path coupling light from the sample to an analyzer or viewer, wherein the filter is a laser-line filter comprising a multi-cavity Fabry-Perot layer and an extended blocking layer made by the method of claim 21.

26. The method of claim 12, wherein the optical filter is a laser-line filter.

27. A laser-line filter comprising (1) a transparent substrate having a first surface and a second surface, (2) one or more multi-cavity Fabry-Perot layers disposed overlying the first surface, and (3) one or more extended blocking layers disposed overlying the second surface, wherein at least one of the multi-cavity Fabry-Perot layers and at least one of the extended blocking layers are formed by the method of claim 12.

28. The laser-line filter of claim 27 further comprising one or more extended blocking layers disposed overlying the first surface.

29. An optical analysis system for exciting a sample of material with light of a first wavelength to produce a measurable or viewable optical response at a second wavelength different from the first, the system comprising a source of excitation light, an optical path coupling the excitation light to the sample, a filter in the path between the source and the sample for blocking light at some wavelengths different from the excitation light, and an optical path coupling light from the sample to an analyzer or viewer, wherein the filter is a laser-line filter comprising a multi-cavity Fabry-Perot layer and an extended blocking layer made by the method of claim 12.

30. A method of making a laser-line filter using an apparatus, the filter designed to have N layers and the method comprising the steps of:

calculating, with a data processor, theoretical transmission data for each layer;

determining, with the data processor, which of the N layers are to be optically monitored, wherein at least one of the N layers determined to be optically monitored is a multi-cavity Fabry-Perot layer and at least one of the N layers determined not to be optically monitored is an extended blocking layer;

calculating an expected deposition time for a current layer being deposited based upon a designed thickness of the layer and a deposition rate of the apparatus for the layer, the current layer being one of the N layers;

measuring, during deposition of the current layer for a time less than the expected deposition time, measured transmission data for the current layer, if the current layer is determined to be an optically monitored layer;

determining, with the data processor, when deposition of the current layer is to terminate based upon the theoretical transmission data and the measured transmission data, if the current layer is determined to be an optically monitored layer; and determining, with the data processor, when deposition of the current layer is to terminate based upon expiration of the expected deposition duration, if the current layer is not determined to be an optically monitored layer.

31. The method of claim 30 wherein the step of determining which of the N layers are to be optically monitored comprises the steps of:

adding noise to the theoretical transmission data, thereby generating estimated actual transmission data;

simulating deposition of the N layers using the theoretical transmission data and the estimated actual transmission data, the simulating producing a simulated thickness for each layer;

calculating an error between the simulated thickness and the designed thickness for each layer; and selecting layers that have an error below a threshold as layers to be optically monitored.

32. A laser-line filter comprising a transparent substrate having a first surface, wherein one or more multi-cavity Fabry-Perot layers and one or more extended blocking layers are disposed overlying the first surface, and wherein at least one of the multi-cavity Fabry-Perot layers and at least one of the extended blocking layers are formed by the method of claim 30.

33. A multi-layer, thin-film laser-line filter exhibiting a transmission of greater than 90%, a full-width at half-maximum passband of at least 0.0031 $\lambda_c$, and a blocking of optical density greater than 5 for wavelengths from $1.01\lambda_c$ to $1.1\lambda_c$ and from $0.92\lambda_c$ to $0.99\lambda_c$, wherein $\lambda_c$ is a wavelength in nm of a laser directed through the filter.

34. The laser-line filter of claim 33, wherein the filter exhibits a blocking of optical density greater than 5 for wavelengths from 1.01 to a wavelength that is red-shifted 4,500 cm$^{-1}$ from $\lambda_c$, and from a wavelength that is blue-shifted 3,600 cm$^{-1}$ from $\lambda_c$ to $0.99\lambda_c$, and wherein $\lambda_c$ is a wavelength in nm of a laser directed through the filter.

35. The laser-line filter of claim 34, wherein the filter is at a wavelength between 532 nm and 980 nm, inclusive.

36. The laser-line filter of claim 34, wherein the filter is at a wavelength between 400 nm and 1,100 nm, inclusive.

37. The laser-line filter of claim 34, wherein the filter is at a wavelength between 325 nm and 400 nm, inclusive, and exhibits a transmission of greater than 80%.

38. The laser-line filter of claim 34, wherein the filter is at a wavelength between 325 nm and 400 nm, inclusive, and exhibits a transmission of greater than 50%.

39. The laser-line filter of claim 33, wherein the filter exhibits a blocking of optical density greater than 6 for wavelengths from $1.015\lambda$ to $1.1\lambda$ and from $0.92\lambda$ to $0.985\lambda$.

40. The laser-line filter of claim 39, wherein the filter is at a wavelength between 532 nm and 980 nm, inclusive.

41. The laser-line filter of claim 39, wherein the filter is at a wavelength between 400 nm and 1,100 nm, inclusive.

42. The laser-line filter of claim 39, wherein the filter is at a wavelength between 325 nm and 400 nm, inclusive, and exhibits a transmission of greater than 80%.

43. The laser-line filter of claim 39, wherein the filter is at a wavelength between 325 nm and 400 nm, inclusive, and exhibits a transmission of greater than 50%.

44. The laser-line filter of claim 33, wherein the filter is at a wavelength between 532 nm and 980 nm, inclusive.

45. The laser-line filter of claim 33, wherein the filter is at a wavelength between 400 nm and 1,100 nm, inclusive.

46. The laser-line filter of claim 33, wherein the filter is at a wavelength between 325 nm and 400 nm, inclusive, and exhibits a transmission of greater than 80%.

47. The laser-line filter of claim 33, wherein the filter is at a wavelength between 325 nm and 400 mm, inclusive, and exhibits a transmission of greater than 50%.

* * * * *

UNITED STATES PATENT AND TRADEMARK OFFICE
CERTIFICATE OF CORRECTION

| | | |
|---|---|---|
| PATENT NO. | : 7,119,960 C1 | Page 1 of 1 |
| APPLICATION NO. | : 90/010879 | |
| DATED | : December 28, 2010 | |
| INVENTOR(S) | : Turan Erdogan et al. | |

It is certified that error appears in the above-identified patent and that said Letters Patent is hereby corrected as shown below:

On the title page of the Ex Parte Reexamination Certificate, item (56), Column 2, Line 1, "6,100,337" should read --6,110,337--.

Signed and Sealed this
Eighth Day of March, 2011

David J. Kappos
*Director of the United States Patent and Trademark Office*

(12) EX PARTE REEXAMINATION CERTIFICATE (7952nd)
United States Patent
Erdogan et al.

(10) Number: US 7,119,960 C1
(45) Certificate Issued: Dec. 28, 2010

(54) METHOD OF MAKING HIGH PERFORMANCE OPTICAL EDGE AND LASER-LINE FILTERS AND RESULTING PRODUCTS

(75) Inventors: Turan Erdogan, Spencerport, NY (US); Joseph T. Foss, Rochester, NY (US); Ligang Wang, Rochester, NY (US)

(73) Assignee: Semrock, Inc., Rochester, NY (US)

Reexamination Request:
No. 90/010,879, Feb. 26, 2010

Reexamination Certificate for:
Patent No.: 7,119,960
Issued: Oct. 10, 2006
Appl. No.: 11/151,728
Filed: Jun. 13, 2005

Related U.S. Application Data

(63) Continuation of application No. 10/840,134, filed on May 6, 2004, now Pat. No. 7,068,430.
(60) Provisional application No. 60/578,978, filed on Jun. 14, 2004, and provisional application No. 60/468,245, filed on May 6, 2003.

(51) Int. Cl.
    G02B 5/28 (2006.01)

(52) U.S. Cl. .................... 359/589; 359/580; 359/587; 359/588; 359/590
(58) Field of Classification Search .................. 359/589
    See application file for complete search history.

(56) References Cited

U.S. PATENT DOCUMENTS

| | | |
|---|---|---|
| 5,112,127 A | 5/1992 | Carrabba et al. |
| 5,216,542 A | 6/1993 | Szczyrbowski et al. |
| 5,512,131 A | 4/1996 | Kumar et al. |
| 5,656,138 A | 8/1997 | Scobey et al. |
| 5,712,715 A | 1/1998 | Erdogan et al. |
| 5,828,489 A | 10/1998 | Johnson et al. |
| 5,900,160 A | 5/1999 | Whitesides et al. |
| 6,100,337 A | 8/2000 | Sullivan et al. |
| 6,217,720 B1 | 4/2001 | Sullivan et al. |
| 6,518,168 B1 | 2/2003 | Clem et al. |
| 6,623,803 B1 | 9/2003 | Krivokapic |
| 6,641,704 B2 | 11/2003 | Someno |
| 6,704,130 B1 | 3/2004 | Ford et al. |
| 7,068,430 B1 | 6/2006 | Clarke et al. |
| 7,123,416 B1 | 10/2006 | Erdogan et al. |

OTHER PUBLICATIONS

Robert B. Sargent and Nada A. O'Brien, "Review of Thin Films in Telecommunications Applications", Optical Interference Coatings (OIC) 2001, Banff, Canada, OIC Proc. Telecommunication Filters I (WA), p. WA2-1 (Jul. 15, 2001).

H. A. MacLeod, Thin Film Optical Filters, 3rd Edition, MacMillan Publishing Co., NY (2001).

Cover page and Table of Contents of vol. 1 of 3 of the Technical Program Proceedings of NFOEC 2001, Tuesday Jul. 10, 2001, pp. v–x (7 pages).

Cover page and Table of Contents of vol. 2 of 3 of the Technical Program Proceedings of NFOEC 2001, Wednesday Jul. 11, 2001, pp. v–x (7 pages).

(Continued)

*Primary Examiner*—James Menefee

(57) ABSTRACT

High performance optical edge and laser-line filters and methods of making the same are disclosed. The optical edge filters have an edge steepness greater than about 0.8% as measured by dividing (a) the edge width from the 50% transmission wavelength to the optical density 6 ("OD6") wavelength by (b) the 50% transmission wavelength. The optical edge filters also have an average transmission above about 95%. The laser-line filters have an extremely high transmission in the passband (greater than 90%), an extremely narrow transmission bandwidth, and achieve blocking with an optical density (OD) greater than 5 at wavelengths that differ from the laser wavelength by less than 1% of the laser wavelength. The methods for making such filters accurately determine when deposition of each layer of the filter should terminate.

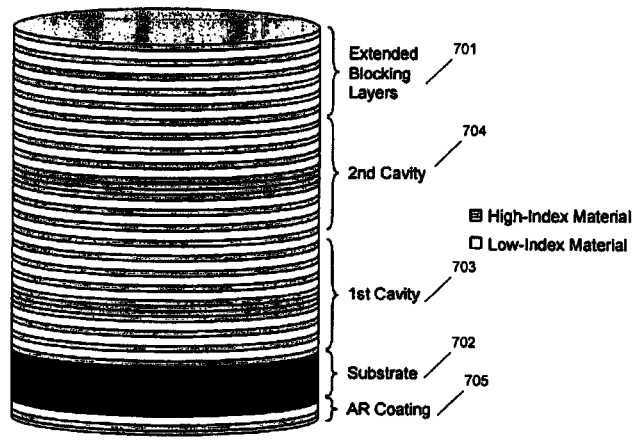

OTHER PUBLICATIONS

Cover page and Table of Contents of vol. 3 of 3 of the Technical Program Proceedings of NFOEC 2001, Thursday Jul. 12, 2001, pp. v–xi (8 pages).

A. Fornier, et al., "High laser damage threshold $HfO_2/SiO_2$ mirrors manufactured by sputtering process," Proceedings of the SPIE, vol. 3492 pp. 912–920 (1999) (9 pages).

R. Fortenberry, et al., "Optical Filter Dispersion in 40 Gb/s DWDM Transmission Systems" in vol. 2 of 3 of the Technical Program Proceedings of NFOEC 2001, Jul. 11, 2001, pp. 670–677 (8 pages).

R. Fortenberry, et al., "NFOEC 2001 Optical Filter Dispersion in 40 Gb/s DWDM Transmission Systems", Captioned: "Cierra Photonics, Inc." (16 pages dated, "Jun. 22, 2001").

Robert Q. Fugate, "Prospects for benefits to astronomical adaptive optics from US military programs,"Proceedings of the SPIE, vol. 4007 pp. 422–429 (2000) (8 pages).

SH. A. Furman, et al., "Chapter 1 Spectral Characteristics of Multilayer Coatings; Theory" from *Basics of Optics of Multilayer Systems,* Edition Frontieres, Gif–Sur–Yvette (1992), pp. 1–103, (104 pages total).

U.J. Gibson, "Ion–Beam Processing of Optical Thin Films," *Physics of Thin Films,* vol. 13, Ed. by M.H. Fancombe and J.L. Vossen, pp. 109–150 (Academic Press, New York, 1987) (42 pages).

H. Hagedorn, et al., "Ultra narrow band pass filters produced by plasma ion assisted deposition," Optical Interference Coatings (OIC) Banff Canada, Telecommuniaction Filters I (WA), p. WA4–1–WA4–3 (Jul. 15, 2001) (3 pages).

R.L. Hall, et al., "The Fabrication of Rugate Filters Using the Digital Technique," Optical Interference Coatings, Technical Digest Series, vol. 6 (Optical Society of America, Washington, DC 1988), pp. TuF10–1–TuF10–4 (4 pages).

J.M.E. Harper, "Ion Beam Deposition," in *Thin Film Processes,* Ed. by J.L. Vossen and W. Kern, pp. 175–206 (Academic Press, New York, 1978) (34 pages).

J.M.E. Harper et al., "Modification of Thin Film Properties by Ion Bombardment During Deposition," in *Ion Bombardment Modification of Surfaces,* Ed. by O. Auciello and R. Kelly, pp. 127–162 (Elsiever, Amsterdam, 1984) (36 pages).

T.R. Jensen, et al., "Environmentally Stable UV Raman Edge Filters", Society of Vacuum Coaters 43rd Annual Technical Conference Proceedings (2000) pp. 1–5 (5 pages).

Walter E. Johnson, et al., "Inroduction to rugate filter technology," Proceedings of the SPIE, vol. 2046 pp. 88–108 (1993) (21 pages).

G. Lenz, et al., "Dispersive Properties of Optical Filters for WDM Systems," IEEE Journal of Quantum Electronics, Aug. 1998, vol. 34, No. 8, pp. 1390–1402 (13 pages).

H.A. MacLeod "Thin–Film Optical Coating Design", from *Thin Films for Optical Systems,* F.R. Flory, ed., Marcel Dekker, Inc., 1995, pp. 17–19, 30–32 (7 pages).

H.A. Macleod, *Thin–Film Optical Filters,* Third Edition, Taylor & Francis, NY, 2001, pp. vii–xi, 20–35, 46–50, 190–200, 210–267 (97 pages total).

Omega Optical Inc., "Precision Interference Filters," (3 page document, 1998 copyright) (4 pages total).

W.H. Press et al., Chapter 15.7 from Numerical Recipes in C: The Art of Scientific Computing, Second Edition (Cambridge University Press, Cambridge, 1992) pp. 699–706 (10 pages total).

M.A. Scobey, et al. "Improved Temperature and Humidity Stability of Ultra–Narrow Band Filters" Society of Vacuum Coaters 37th Annual Technical Conference Proceedings (1994) pp. 47–52 (6 pages).

Software Spectra, "Summary of TFCalc features", web.archive.org/web/2002020402003635/www.sspectra.com, (3 pages).

Thin Film Center, Inc. "The Concise Macleod," web.archive.org/web/2002020506111/www.thinfilmcenter.com (3 pages).

R.–Y. Tsai, et al., "Comparative Study of Ultraviolet–Infrared Cutoff Filters Prepared by Reactive ElectronBeam Deposition and Reactive Ion–Assisted Deposition", Opt. Eng., May 1998, pp. 1475–1481 (7 pages)

EX PARTE REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 33-47 is confirmed.

Claims 1-32 were not reexamined.

* * * * *